United States Patent
Malwankar et al.

(10) Patent No.: US 10,175,891 B1
(45) Date of Patent: Jan. 8, 2019

(54) MINIMIZING READ LATENCY FOR SOLID STATE DRIVES

(71) Applicant: Pavilion Data Systems, Inc., San Jose, CA (US)

(72) Inventors: Kiron Balkrishna Malwankar, Saratoga, CA (US); Karagada Ramarao Kishore, Saratoga, CA (US); Sundar Kanthadai, Fremont, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 0 days.

(21) Appl. No.: 15/458,778

(22) Filed: Mar. 14, 2017

Related U.S. Application Data

(60) Provisional application No. 62/308,731, filed on Mar. 15, 2016.

(51) Int. Cl.
| | |
|---|---|
| G06F 12/00 | (2006.01) |
| G06F 3/06 | (2006.01) |
| G06F 12/02 | (2006.01) |

(52) U.S. Cl.
CPC .......... *G06F 3/0611* (2013.01); *G06F 3/064* (2013.01); *G06F 3/0656* (2013.01); *G06F 3/0659* (2013.01); *G06F 3/0665* (2013.01); *G06F 3/0688* (2013.01); *G06F 12/0246* (2013.01); *G06F 2212/1024* (2013.01); *G06F 2212/152* (2013.01); *G06F 2212/214* (2013.01); *G06F 2212/657* (2013.01); *G06F 2212/7201* (2013.01); *G06F 2212/7203* (2013.01)

(58) Field of Classification Search
CPC ...... G06F 3/0611; G06F 3/064; G06F 3/0656; G06F 3/0659; G06F 3/0665; G06F 3/0688; G06F 12/0246; G06F 2212/1024; G06F 2212/152; G06F 2212/214; G06F 2212/657; G06F 2212/7201; G06F 2212/7203
See application file for complete search history.

(56) References Cited

U.S. PATENT DOCUMENTS

| | | | |
|---|---|---|---|
| 2006/0026211 A1* | 2/2006 | Potteiger | G06F 3/061 711/103 |
| 2009/0248964 A1* | 10/2009 | Yano | G06F 12/0246 711/103 |
| 2016/0041790 A1* | 2/2016 | Jones | G06F 12/0246 714/773 |

* cited by examiner

*Primary Examiner* — Kalpit Parikh
(74) *Attorney, Agent, or Firm* — Lowenstein Sandler LLP

(57) ABSTRACT

A processing device of a storage server receives a write request to write to a first logical address of a virtual storage device that is mapped to a plurality of SSDs. The processing device stores a data block associated with the request in a buffer, stores an entry for the write request in a queue, the entry comprising a reference to the data block in the buffer, sends a write command to an SSD, the write command comprising the data block, and subsequently receives an acknowledgment that the data block has been written to the SSD. The processing device maintains the data block in the buffer until a combined size of a plurality of data blocks in the buffer is equal to or greater than a threshold, the threshold being based on a number of SSDs in the plurality of SSDs and a block size of the plurality of SSDs.

18 Claims, 10 Drawing Sheets

MINIMIZING READ LATENCY FOR SOLID STATE DRIVES

RELATED APPLICATIONS

The present application claims the benefit of U.S. Provisional Application No. 62/308,731 filed Mar. 15, 2016, which is incorporated herein by reference.

FIELD OF TECHNOLOGY

This disclosure relates generally to the field of data storage and in particular to minimizing read latency for solid state storage devices.

BACKGROUND

Networked storage arrays may provide an enterprise level solution for secure and reliable eligible data storage. With the introduction of solid state storage devices solid state drives (SSDs) such as Flash drives), the speed of such networked storage arrays has improved dramatically. Low latency is an important performance metric for SSDs. Most SSDs have average read latencies that may span a wide range, which can cause problems to applications and hosts that access data an these drives. Thus, latency consistency can be an important metric for applications and hosts accessing data on SSDs.

BRIEF DESCRIPTION OF THE DRAWINGS

The embodiments described herein will be understood more fully from the detailed description given below and from the accompanying drawings.

DETAILED DESCRIPTION

Figure 1:
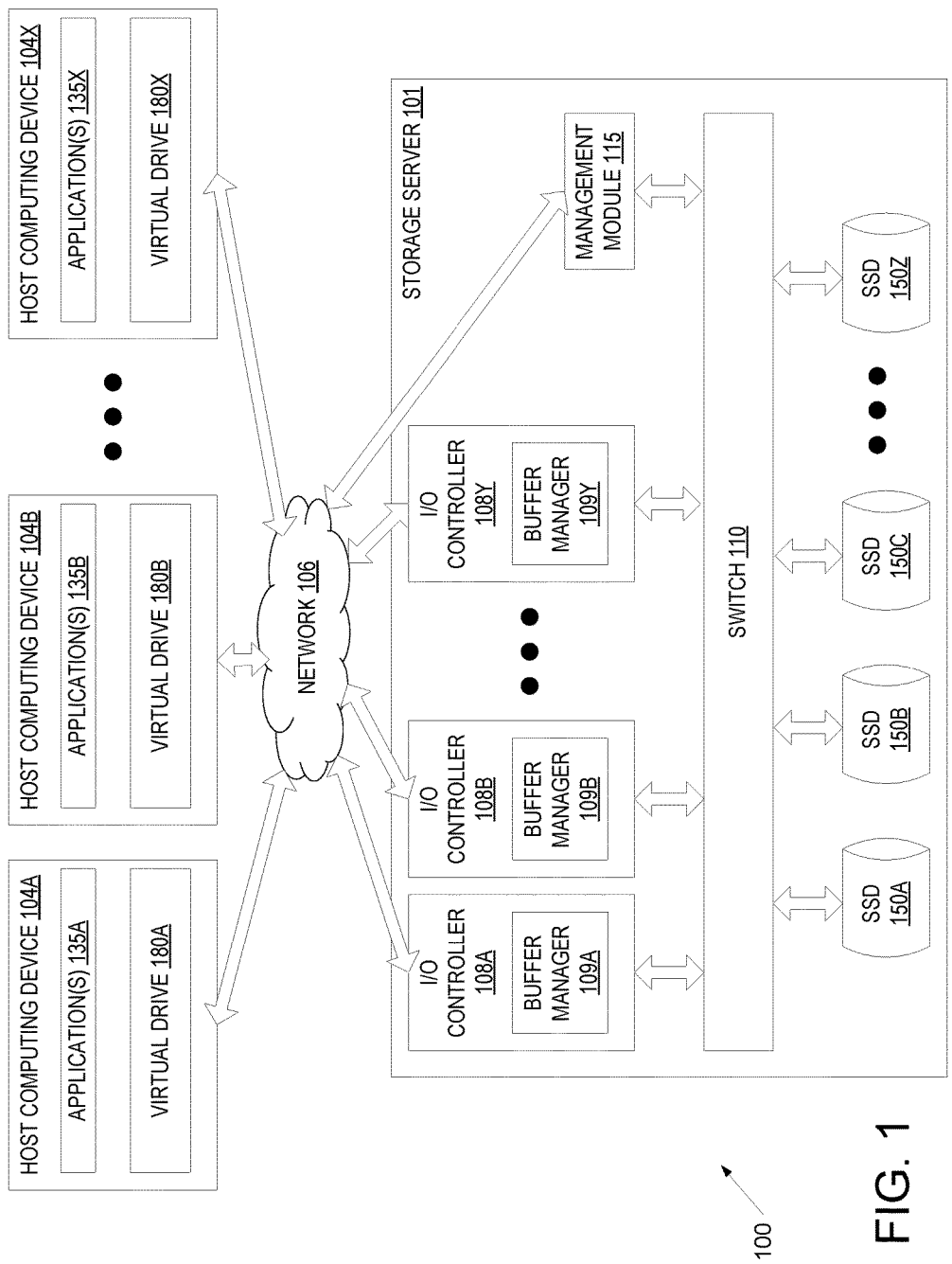
FIG. 1 is a block diagram example of a network architecture, in which embodiments described herein may operate.

Described herein are systems and methods that enable and implement minimized read latency for solid state drives (SSDs). When applications access data from storage arrays, the performance of the applications may rely on receiving the data in a consistent amount of time across multiple requests. Read latencies provided by SSDs can be low and can provide a significant boost to application performance. However, if an SSD's read latency varies significantly from one request to another it can have negative effects on dependent applications. Additionally, hosts that access the SSD may apply a large buffer to accommodate the occasional slow response. However, at most times that large buffer is underutilized. By minimizing read latency on the storage server, the buffer that is used by a host for reads may be reduced. Moreover, in some implementations, when a read request takes a long period of time to complete, other requests in queue behind the read request may be delayed. This, in turn, may consume system resources that may otherwise be used by new requests. Such problems can be mitigated by minimizing read latency on the storage server.

Solid state drives (SSDs) can provide low latency for read requests in many situations. However, writing data to a particular block of an SSD followed by a subsequent attempt to read data from a different page within that same block can involve significant delays in processing the read. Subsequent reads of a block of an SSD that is being accessed by a preceding write may incur an exponentially higher latency than would otherwise be observed by a normal read request. Embodiments mitigate or eliminate the high latency associated with such read requests.

Embodiments described herein provide a buffer manager component of a storage server I/O controller that can provide minimized read latency for read requests sent to solid state drives in a storage array. A storage buffer local to the I/O controller may be configured to store an amount of data associated with write requests received by the I/O controller that can be used to service subsequent read requests while the SSDs of the storage array may be engaged in updating data blocks. The buffer manager can utilize threshold buffer sizes to manage the amount of data stored in the buffer so that it remains efficiently tuned to retain only as much data as would be needed to balance minimized read latency times against wasted resources on the storage server. When the size of the buffer exceeds a threshold, the buffer manager can initiate the deletion of data blocks stored in the buffer that are associated with the oldest write request received by the I/O controller. Since the latency incurred due to reading data from a buffer on the I/O controller can be orders of magnitude lower than an average read from an SSD, embodiments described herein can provide latency for read requests that remains consistent across multiple SSDs.

In embodiments, the I/O controller may receive a write request to write to a first logical address of a virtual storage device that is mapped to a plurality of SSDs, where the write request includes a first logical address and is associated with a data block. The I/O controller may then store the data block in a buffer, and store an entry for the write request in a queue that includes a reference to the data block in the buffer. The I/O controller may send a write command that includes the data block to an SSD, and subsequently receive an acknowledgment that the data block has been written to the SSD. The I/O controller may then maintain the data block in the buffer until a combined size of all data blocks in the buffer is equal to or greater than a threshold. Responsive to receiving a subsequent read for the same logical address associated with the write request, the I/O controller may then determine if the data block is present in the buffer, and if so, retrieve the data block from the buffer to satisfy the read request.

FIG. 1 is a block diagram example of a network architecture 100, in which embodiments described herein may operate. The network architecture 100 may include one or more host computing devices (e.g., host computing devices 104A, 104B through 104X) connected to a storage server 101 via a network 106. Network 106 may be a wide area network (WAN) such as the Internet, a local area network (LAN), a storage area network (SAN) or a combination thereof. The host computing devices 104A-X and/or storage server 101 may connect to the network 106 via an Ethernet, Fibre Channel (FC), Fibre channel over Ethernet (FCoE), serial attached small computer system interface (SAS) or serial ATA (SATA) protocol. Alternatively, other protocols may be used to connect to the network 106.

Storage server 101 is a computing device that is configured and optimized to provide storage to remote computing devices (e.g., to host computing devices 104A-X). Storage server 101 may be configured as a storage area network (SAN), network attached storage (NAS), or other remote storage type. Though a single storage server 101 is shown, the host computing devices 104A-X may connect to multiple storage servers. The multiple storage servers may be arranged in a cluster or other configuration.

Storage server 101 includes multiple I/O controllers 108A, 108B through 108Y connected to multiple solid state drives (SSDs) 150A, 150B, 150C through 150Z via a switch 110. The SSDs 150A-Z may be SAS/SATA drives, non-volatile memory express (NVMe) drives, small computer system interface (SCSI) over PCIe (SOP) drives, or solid state drives that communicate using different protocols. The number of SSDs included in storage server 101 may be less than 10 to more than 100. The solid state drives may have the same or different storage capacities. In some implementations, the number of host computing device 104A-X, the number of I/O controllers 108A-Y, and the number of SSDs 150A-Z may be different from each other.

Each I/O controller 108A-Y is a device configured to connect one or more host computing devices 104A-X to one or more SSDs 150A-Z. Each I/O controller 108A-Y includes one or more network interface controllers (NICs) such as Ethernet NICs and/or other protocol adapters (e.g., such as FC, SAS/SATA, or Infiniband (IB) adapters) that connect that I/O controller to network 106. Each I/O controller 108A-Y additionally includes a port that connects to switch 110 via an internal bus. In one embodiment, I/O controllers 108A-Y include peripheral component interconnect express (PCIe) ports that connect to switch 110 via a PCIe bus. Alternatively, or additionally, I/O controllers 108A-Y may include small computer system interface (SCSI) ports, serial attached SCSI (SAS) ports, serial ATA (SATA) ports, Fibre Channel ports, or universal serial bus (USB) ports or other ports for connecting to the switch 110. I/O controllers 108A-Y may additionally include a volatile and/or non-volatile memory to store firmware and/or software for performing operations described herein. Volatile memory may also be used for a data cache or buffer (e.g., as a write cache and/or a read look ahead cache). For example, I/O controllers 108A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

I/O controllers 108A-Y may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each I/O controller 108A-Y is a system on a chip (SoC) including a processing device, a memory, one or more NICs and one or more internal ports.

Each I/O controller 108A-Y is assigned to one or more host computing devices 104A-X, and handles input/output (I/O) commands for those host computing devices. Applications 135A-X running on a host computing device 104A-X may attempt to read data from and/or write data to a virtual drive 180A-X that the host computing device 104A-X has access to. Responsive to such a read or write request, the host computing device 104A-X encapsulates a read or write request into a message (e.g., into an Ethernet packet) and sends the message to the I/O controller 108A-X that is assigned to that host computing device 104A-X.

In some implementations, the host computing device 104A-X may break up an amount of data to be written into individual data blocks based on network transport limits of the network 106 (e.g., based on the allowed packet sizes of Ethernet). Alternatively, the host computing device 104A-X may break up the data to be written into individual blocks based at least in part on a page size associated with the SSDs 150A-Z. For example, data may be broken into blocks that are smaller than the network transport limits and that conform to a page size of SSDs 150A-Z. A page is typically the smallest unit of addressing granularity for an SSD. For example, if the host computing device 104A-X needs to write 40 kilobytes of data where the page size of SSDs 150A-Z is 4 kilobytes (4 kB), it may divide the write into 10 data blocks of 4 kB each. The host computing device may then send the 4 kB data blocks encapsulated in the write request. Alternatively, the I/O controller 108A-Y may, upon receipt of the write request, retrieve each data block individually from the host computing device 104A-X. This may include sending separate requests for each data block to the host computing device 104A-X and receiving the data blocks.

When the I/O controller 108A-Y receives a read or write command from the host computing device 104A-X, the I/O controller 108A-Y extracts the read or write command from the message and determines what logical addresses of the virtual drive 180A-X should be used to write the data to or read the data from. The I/O controller 108A-Y may additionally translate the logical addresses of the virtual drive to physical addresses of the SSDs 150A-Z. The I/O controller 108A-Y may then generate one or more commands directed to the determined SSDs 150A-Z to write data to those SSDs or read data from those SSDs 150A-Z.

The I/O controller 108A-Y may receive a write request from the host computing device 104A-X to write to a logical address of a virtual storage device (virtual drive 180A-X) mapped to SSDs 150A-Z. The write request may include the logical address and may be associated with one or more data blocks to be written. The I/O controller 108A-Y may first retrieve the data blocks associated with the write request and subsequently store each data block in a buffer local to the I/O controller 108A-Y. The I/O controller 108A-Y may then store an entry for the write request in a queue of write requests that have been received by the I/O controller 108A-Y. The queue entry can include a starting logical block address for the write request, a total number of data blocks to write, a total size of the data to write (e.g., in kilobytes, megabytes, etc.), and/or other similar information. The queue entry may also include a reference or pointer to the data blocks associated with the write request. For example, the queue entry may include the buffer location address of the data blocks associated with the write request.

I/O controller 108A-Y may then send a write command to one of the SSDs 150A-Z for each of the data blocks associated with the received write request. Once a write command has been successfully completed by the destination SSD 150A-Z, I/O controller 108A-Y may subsequently receive an acknowledgment that the applicable data block has been written to that SSD. I/O controller 108A-Y may set an acknowledgment status associated with the data block in the buffer to indicate that the write command for that data block has completed. Once acknowledgments for each of the data blocks associated with the write request have been received from the applicable SSDs 150A-Z, I/O controller 108A-Y may return a response to the write request received from host computing device 104A-X.

Notably, in embodiments the data blocks associated with write requests are not immediately removed from the buffer responsive to acknowledgments of the write requests. By retaining the data blocks in the buffer, subsequent read requests may be serviced from the buffer in order to significantly decrease latency for read requests. In contrast, write buffering for traditional storage arrays typically removes data blocks from an associated buffer space as soon as an acknowledgment is received from the destination SSD in order to reduce an amount of system resources used for the buffer and minimize performance problems (e.g., due to memory bloat, slowing of additional I/O operations due to lack of resources, etc.). However, in embodiments, the buffer may be managed by monitoring its size in relation to high and low threshold values to prevent excessive dedicated system resources while maximizing the opportunity to use the buffer space to reduce read latency.

I/O controller 108A-Y may receive a read request from the host computing device 104A-X to read from a logical address of the virtual storage device. In some cases, the read request may be received after receiving a write request for the same logical address. I/O controller 108A-Y may then determine if there is a data block in the buffer associated with the logical address specified by the read request (e.g., as a result of a previous write request to the same logical address). If so, I/O controller 108A-Y may then determine the location of the associated data block in the buffer, and retrieve the data block from the buffer. I/O controller 108A-Y may return a response to the read request received from the host computing device 104A-X using the data block retrieved from the buffer.

Servicing read requests from the buffer offers several performance improvements over traditional systems. First, latency times for retrieving data from the buffer are much lower than that for retrieving data from an SSD. So, when data for a logical address is present in the buffer, using the buffered data over retrieving the data from the SSD can improve performance for read requests as well as improve performance overall since every request is not getting forwarded to the SSDs. Moreover, in cases where a read request is received for a logical address that maps to a page in an SSD block that is locked due to another process executing a write request to another page on that same block, the read request may be serviced without experiencing the increased latency that is generally encountered while an SSD completes a write operation. Thus, read latency outliers in this particular case may be significantly reduced.

If I/O controller 108A-Y determines that a data block associated with the logical address specified by a read request is not present in the buffer, I/O controller 108A-Y may then send a read command to one of the SSDs 150A-Z to obtain the data to satisfy the request. Similarly, if I/O controller 108A-Y receives a read request for multiple data blocks and only some of those data blocks are present in the buffer, I/O controller 108A-Y may retrieve any data blocks in the buffer and send read commands to the applicable SSDs 150A-Z for any data blocks not stored in the buffer. I/O controller 108A-Y may then construct a response to be returned to the host computing device 104A-X with the combination of the buffered data and the data returned from the SSDs 150A-Z.

Each I/O controller 108A-Y may include a buffer manager 109A-Y that manages the contents of the buffer to minimize latency for responses to read requests from host computing devices 104A-X. Buffer manager 109A-Y can maintain data blocks in the buffer until a combined size of all data blocks in the buffer is equal to or greater than a high threshold. If the size of the buffer meets the high threshold, Buffer manager 109A-Y may begin deleting data blocks from the buffer until the combined size of all data blocks in the buffer is equal to or below a low threshold.

Each SSD 150A-Z has a controller and a storage area that includes memory (e.g., NAND Flash non-volatile memory) to store data. The storage area is divided into pages, which is the smallest unit of storage to which data may be stored. SSD pages may have sizes based on a configuration of an SSD. For example, SSDs 150A-Z may have pages that are 4 kilobytes (kB), 8 kB, or 16 kB. However, other page sizes are also possible. SSD pages are grouped into blocks. Each block contains a particular number of pages, which is again dependent on a design of a particular SSD. Typical SSDs have blocks that include 256 pages. Notably, conventionally an SSD may only perform a write or a read to a single page in a block at a time.

In some implementations, the high threshold may be based on the number of SSDs 150A-Z and the block size associated with SSDs 150A-Z. Some SSDs additionally include multiple silicon dies (silicon wafers), each die containing several SSD blocks. Buffer manager 109A-Y may set a maximum buffer size to the number of SSDs 150A-Z on server 101, multiplied by the SSD block size associated with SSDs 150A-Z, and further multiplied by the number of dies associated with SSDs 150A-Z. Since a write request generally involves a page of storage, and an SSD block includes multiple pages, using the block size as a determining factor can provide a large enough buffer space to accommodate writes in progress across a storage array. If a read operation addressed to one page while a write is in progress to another page on the same block, the read must wait until the write is complete. Moreover, if multiple blocks are on the same die, then concurrent operations are not permitted on the same die. Setting the buffer size in this manner can provide an optimized stored history of received write requests, thus providing a reasonable view "back in time" for previously received write requests without over allocating system resources for the buffer that may be used elsewhere.

Buffer manager 109A-Y may set the high threshold to a value that is a predetermined percentage below the maximum buffer size. Buffer manager 109A-Y may additionally set a low threshold to a value that is a predetermine percentage below the high threshold. The high and low threshold values may be determined by a benchmarking component (not pictured) of storage server 101 and stored in a configuration data store accessible to buffer manager 109A-Y. Alternatively, buffer manager 109A-Y may monitor storage usage of the SSDs 150A-Z and compute the high and low threshold values based on observed usage of the SSDs 150A-Z. In an illustrative example, the high threshold value may be set to 75% of the maximum buffer size, and the low threshold may be set to 50% of the maximum buffer size. The high threshold may be set at least in part on the memory available to I/O controller 108A-Y after allocating memory for other system operational functions.

After each write request is processed by I/O controller 108A-Y, buffer manager 109A-Y may determine the current size of the buffer, where the current size is the combined size of the data blocks stored in the buffer. If the current size of the buffer is equal to or greater than the high threshold value, buffer manager 109A-Y may delete one or more data blocks from the buffer until the size of the buffer is equal to or less than the low buffer threshold. To identify data blocks in the buffer that may be eligible for deletion, buffer manager 109A-Y may first determine the oldest queue entry in the write queue, where the oldest entry is the entry that has been stored in the write queue for a period of time that is greater than that of any other entry in the queue. For example, in a FIFO queue, the oldest entry will be at the head of the queue (and thus, the "first out" of the queue).

After deleting the selected data block, buffer manager 109A-Y may then recheck the size of the buffer and repeat the process until the size of the buffer is equal to or less than the low threshold. If all of the data blocks associated with the oldest entry in the queue have been deleted from the buffer, buffer manager 109A-Y may remove the oldest entry from the queue. If the low threshold has not yet been met, buffer manager 109A-Y may select the next eligible entry in the queue (the "new" oldest entry) and repeat the process until the low threshold is met or no data blocks are present in the buffer that are eligible for deletion. In one embodiment, a data block is eligible for deletion if a write acknowledgement for the data block has been received from and SSD 150A-Z.

In some implementations, buffer manager 109A-Y may additionally or alternatively consider spatial locality of data blocks when identifying data blocks in the buffer that may be eligible for deletion. Thus, a data block that has been accessed by a subsequent read may be retained in the buffer longer than a data block that has not been accessed by a subsequent read. Data blocks that have been read once may be more likely to be read again, so by retaining these data blocks in the buffer for a longer period of time, performance of additional subsequent reads on these data blocks can be improved even though these data blocks may be the oldest in the buffer and would otherwise be eligible for deletion.

Buffer manager 109A-Y may store information associated with each data block that indicates whether or not that data block has been accessed by a subsequent read. For example, a Boolean indicator may be saved for the data block to indicate whether or not the data block has been accessed. Alternatively, timestamp information may be saved for the data block that retains the time of the most recent subsequent read of that data block. If the current size of the buffer is equal to or greater than the high threshold value, when buffer manager 109A-Y identifies a data block in the buffer that may be eligible for deletion, it may then determine whether the data block has been accessed by a subsequent read. If so, buffer manager 109A-Y may skip that data block and look for a data block that has not been accessed by a subsequent read.

In one embodiment, when a read is received for a data block in the buffer, an entry in the write queue associated with that data block gets moved in the write queue. In one embodiment, the entry associated with that data block is moved to a back of the write queue. Alternatively, the entry associated with that data block may be moved backwards in the write queue by one or more entry. This may reduce the chance that the data block that has been read will be removed from the write queue.

In one embodiment, buffer manager 109A-Y may first identify the oldest queue entry in the write queue, select a data block associated with the oldest entry, and then determine whether it has been accessed by a subsequent read as described above. In another embodiment, buffer manager 109A-Y may manage pointers that keep track of the entries in the write queue that are associated with data blocks that have been subsequently read. When a read request accesses a data bock in the buffer, buffer manager 109A-Y may update the pointers accordingly. Thus, when buffer manager 109A-Y selects an entry in the write queue, it may compare that entry against the pointers prior to checking any of the data blocks. If the pointers indicate that the selected write queue entry has data blocks that have been read, that write queue entry may be skipped and another may be selected. For example, buffer manager 109A-Y may maintain a pointer that references the oldest write that has not yet been read, and may use this entry in the write as a starting point each time the high threshold is met.

If a second write request is received for a data block that has been identified as read (and thus not eligible for deletion), the pointers (or, alternatively, the information stored for the data block) may be updated to allow that data block to be deleted the next time the threshold is met. Since the data blocks associated with the subsequent write should contain the most recent data on the drive, this data should be returned for a subsequent read, so any prior data blocks may now be eligible for deletion.

Switch 110 is a multi-port bridge that connects I/O controllers 108A-Y to SSDs 150A-Z. Switch 110 manages the flow of data within storage server 101 by connecting specific I/O controllers 108A-Y to specific SSDs 150A-Z on a message by message basis, allowing the switch 110 to regulate the flow of traffic. Each I/O controller 108A-Y and each SSD 150A-Z connected to switch 110 can be identified using a unique address (e.g., a unique port address) of the I/O controller or SSD. Switch 110 may be a PCIe switch, an Ethernet switch, a SAS or SATA expander, a USB switch, or other type of switch.

Each solid state drive (SSD) 150A-Z (also referred to as a solid state age device) is a non-volatile storage device that uses integrated circuits to persistently store data. SSDs 150A-Z have numerous advantages over traditional disk drives. As compared to disk drives, SSDs are more resilient, consume less power, and have lower latency (access times). In one embodiment, SSDs 150A-Z are NAND-based Flash memory devices or NOR-based Flash memory devices. Flash memory devices are non-volatile and can be electronically erased and reprogrammed. Alternatively, one or more SSDs 150A-Z may be volatile memory-based solid state drives (e.g., dynamic random access memory (DRAM)-based SSDs) that have a battery backup. SSDs 150A-Z may include one or more ports (e.g., PCIe ports) to connect to switch 110. SSDs 150A-Z may connect to switch 110 via PCIe, SCSI, SAS, USB, or other connection protocols.

Storage server 101 additionally includes a management module 115. Management module 115 may be a device configured to perform particular operations with regards to management of the array of SSDs 150A-Z. Management module 115 may include a processing device, a port for connecting to switch 110 and a NIC for connecting to network 106. Management module 115 may additionally include a volatile and/or non-volatile memory to store firmware and/or software for performing operations described herein. In one embodiment, management module 115 is a SoC.

The management module 115 determines how to configure the array of SSDs 150A-Z and further determines configurations for the one or more virtual drives 180A-X. For example, management module 115 may determine which virtual drives 180A-X map to which physical SSDs and which portions of those SSDs the virtual drives map to. Once these configurations are determined, management module 115 may send these configurations to the I/O controllers 108A-Y for implementation. Management module 115 additionally performs discovery operations and may be responsible for paring I/O controllers 108A-Y with host computing devices 104A-X. Discovery operations may be initiated when storage server 101 powers on and/or to connect host computing devices to new or updated virtual drives.

Host computing devices 104A-X may each include a physical machine and/or a virtual machine hosted by a physical machine. The physical machine may be a rack-mount server, a desktop computer, or other computing device. In one embodiment, one or more host computing device 104A-X includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Each host computing device 104A-X may host one or more applications 135A, 135B through 135X. The applications 135A-X may be application servers, web servers, standalone applications, and so forth. Accordingly, host computing devices 104A-X may provide services to clients via applications 135A-X in some embodiments.

Each host computing device 104A-X may additionally mount or otherwise connect to one or more virtual drives 180A, 180B through 180X (e.g., one or more logical unit numbers (LUNs) and/or one or more virtual NVMe drives). Though each host computing device 104A-X is shown to mount a different virtual drive 180A-X, different host computing devices may mount or connect to the same virtual drive. Each virtual drive 180A-X is a logical storage device that maps a logical storage address space to physical storage address spaces of multiple storage devices (e.g., solid state drives (SSDs) 150A, 150B, 150C through 150Z of storage server 101). Additionally, a virtual drive 180A-X may map a logical storage address space to physical storage address spaces of storage devices on multiple different storage servers.

Figure 2:
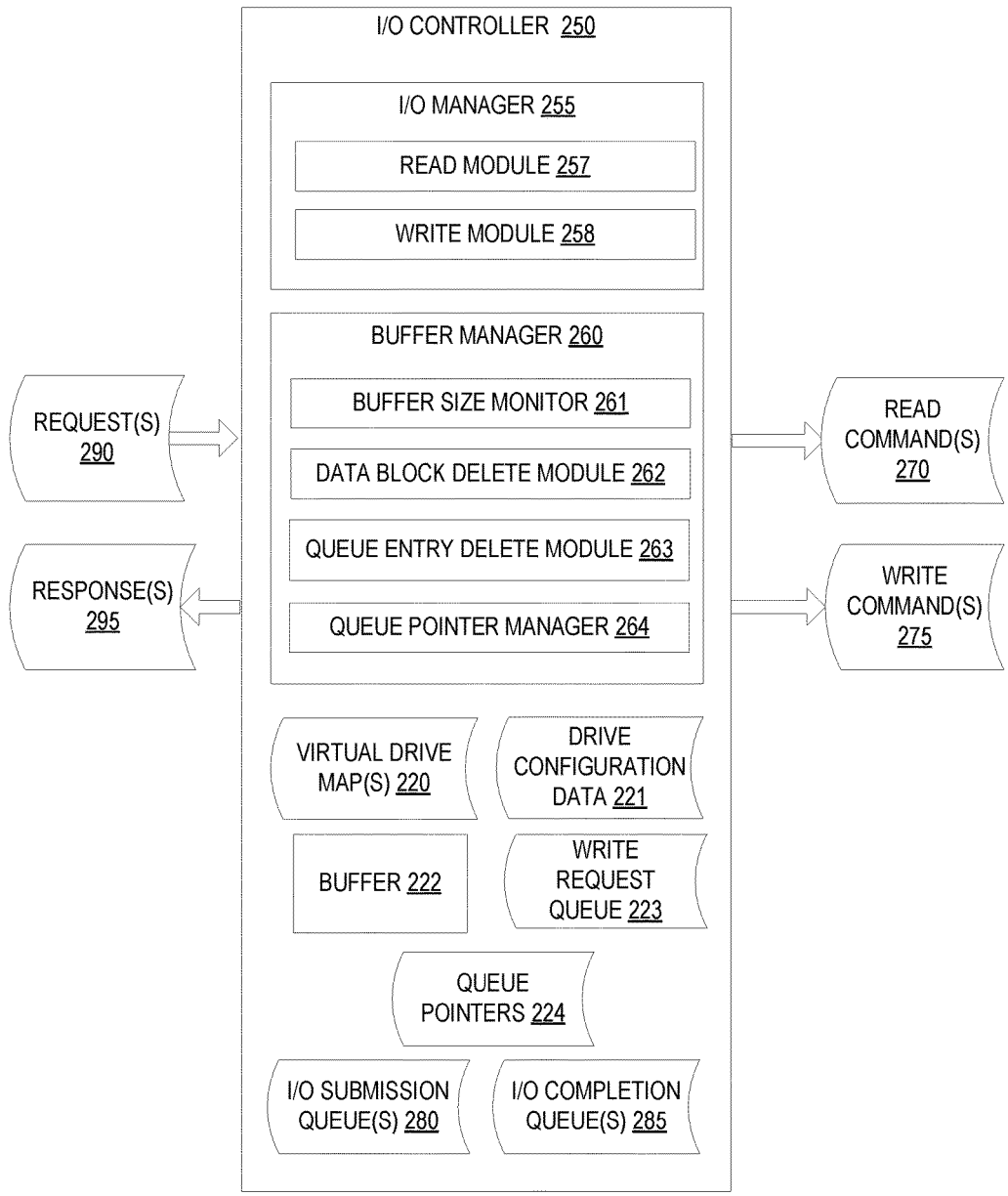
FIG. 2 is a block diagram of one embodiment of an I/O controller.

FIG. 2 is a block diagram of one embodiment of an I/O controller 250 showing logical modules that may be loaded into and executed by a processing device of I/O controller 250. Alternatively, I/O controller 250 may include one or more physical modules (e.g., an integrated circuit (IC) designed with described modules or a configurable logic such as a field programmable gate array (FPGA) configured to have the modules). In one embodiment, I/O controller 250 corresponds to an I/O controller 108A-Y of FIG. 1.

In one embodiment, I/O controller 250 includes the module of an input/output (I/O) manager 255. The I/O manager 255 in one embodiment includes a read module 257 and a write module 258. Alternatively, the read module 257 and/or write module 258 may be distinct modules that are separate from I/O manager 255.

I/O manager 255 is responsible for communicating with host computing devices and satisfying input/output (I/O) commands such as read commands and write commands from the host computing devices. I/O controller 250 receives requests 290 from host computing devices. The requests 290 may be, for example, messages encapsulated as Ethernet packets. The received requests 290 may contain I/O commands and/or data. Responsive to receipt of a request 290 from a host, I/O manager 255 may remove an I/O command and/or data from the request and/or determine which module 257-258 should handle the data or I/O command.

In one embodiment, each of the requests 290 is an Ethernet packet having a particular format and encapsulating an I/O command such as a read command or a write command. The Ethernet packet may include a transport header identifying a destination address (e.g., a destination MAC address), a source address (e.g., a source MAC address), and a virtual local area network (VLAN) tag (if appropriate). A command payload in the I/O command may include specific command instructions, such as specific read or write instructions. The specific command instructions may be NVMe command instructions (e.g., NVMe read commands or NVMe write commands), or may include other read or write commands. A data payload in the I/O command may include data to be written to storage or data that has been retrieved from storage.

In one embodiment, responsive to receipt of a write command, I/O manager 255 invokes write module 258. Write module 258 is responsible for responding to write commands (also referred to as write requests). In one embodiment, the command payload of the write command identifies a length of data to be written. Write module 258 may determine what logical block addresses to write the data to, and may use a virtual drive map 220 for the virtual drive to determine what locations (e.g., what SSD pages) on the physical storage devices (e.g., physical SSDs) correspond to the logical block addresses of the virtual drive. Alternatively, the logical block addresses (e.g., a starting logical block address and length) may be indicated in the write command.

The write request may include the logical address and may be associated with one or more data blocks to be written. In one embodiment, the write request does not include payload data to be written to storage. Instead, write module 258 may use data from the write request to retrieve the data blocks associated with the write request from the host that requested the write. Write module 258 may subsequently store each data block in buffer 222. Write module 258 may additionally store an entry for the write request in a write request queue 223 that contains entries for any write request that has been received by I/O controller 250. The queue entry can include the starting logical block address for the write request, the total number of data blocks to write, the total size of the write (e.g., in kilobytes, megabytes, etc.), or other similar information. The queue entry may also include a reference to the data blocks stored in buffer 222 that are associated with the write request. In one embodiment, the queue entry may include the addresses in the buffer 222 of the data blocks associated with the write request. In another embodiment, the queue entry may include pointers to the data blocks in buffer 222 associated with the write request. In another embodiment, the queue entry may reference the associated data blocks using a linked list style data structure, where the queue entry includes a reference to the first data block, the first data block include a reference to a second data block, the second data block includes a reference to a third data block, and so on. Alternatively, the locations of data blocks in the buffer may be included in the virtual drive map 220.

In one embodiment, following the request (e.g., Ethernet packet) encapsulating the write command, I/O controller 250 may receive additional messages identifying the particular write command and encapsulating data to be written that is associated with the write command. Such additional messages may be received responsive to requests for the data sent from the I/O controller 250 to the host. Since Ethernet packets have a dictated maximum size, the data to be written may be broken up into portions, where each portion can be encapsulated within a separate Ethernet packet. I/O manager 255 removes the data from each such message (e.g., from each Ethernet packet) and provides the data to write module 258. Write module 258 may then add the received data extracted from the Ethernet packets (or other messages) into buffer 222 as noted above. In one embodiment, the amount of data in each message is equal to the page size of the SSDs (e.g., 4 kB).

I/O manager 255 may additionally update a set of queue pointers 224 that can be used to manage the contents of write request queue 223. These queue pointers 224 and may reference particular entries in write request queue 223. Queue pointers 224 may include an oldest entry pointer that references the entry in write request queue 223 that has been stored in the queue for a period of time that is greater than that of any other entry stored in the queue. Queue pointers 224 may additionally include a newest entry pointer that references the entry in write request queue 223 that is the most recent entry to have been added to the queue. Queue pointers may additionally include a write-acknowledged pointer that points to an oldest write for which not all acknowledgements have been received. The write-acknowledged pointer is discussed in greater detail below. The pointers in queue pointers 224 may be updated when a queue entry is added to write request queue 223, when an entry is deleted from write request queue 223, when a write acknowledgment is received for an entry in the write request queue 223 and/or at other times. For example, when a new request is added, the newest entry pointer may be updated so that it references the new request. Similarly, if the oldest entry in the queue is deleted, the oldest entry pointer may be updated so that it references the entry that that represents the oldest entry in the queue once the delete of the former oldest entry has completed.

Write module 258 may additionally store a table entry in a mapping table (e.g., virtual drive map 220) for each of the data blocks associated with the write request. In some embodiments, the table entry may include the logical address of the data block, the physical address of the SSDs to which the data from the data block will be written, the address of the data block in the buffer (e.g., an address, pointer, etc.), and/or any similar information. The mapping table may thus provide a way to map a logical address to a physical address for data blocks written to the physical SSDs as well as whether those data blocks are stored in the buffer 222.

Write module 258 may generate write commands 275 for each of the data blocks associated with a received write request. Each write command 275 may specify a data block in the buffer 222 to be written to a page in an SSD. For example, if a virtual drive maps to three SSDs, write module 258 may determine that a first data block is to be written to a first page on a first SSD, a second data block is to be written to a second page on a second SSD, and a third data block is to be written to a third page on a third SSD. Write module 258 may then generate a first write command to write the first data block to the first page of the first SSD, a second write command to write the second data block to the second page of the second SSD, and a third write command to write the third data block to the third page of the third SSD. The write command may be placed into I/O submission queues 280 for each of the drives that are managed by the I/O manager. Once a write sub-request reaches the front of an I/O submission queue 280, write module 258 may then send the generated write command to the appropriate SSD.

The SSDs receive the write commands and write the data blocks to the specified locations. The SSDs may then return a completion notification or "acknowledgment" for the write commands. These acknowledgments may be added to the I/O completion queue 285. For each acknowledgement received, write module 258 may set an acknowledgment status associated with the applicable data block in the buffer 222 to indicate that the write command for that data block has completed. The acknowledgement status may be stored as part of the data block in the buffer, in a separate data structure that is associated with the data block (e.g., via a pointer or address location), or in any similar manner.

Once acknowledgments have been received from each of the SSDs to which data was written (and in some embodiments these completion notifications reach a front of the I/O completion queue), write module 258 may update the write-acknowledged entry pointer in the set of pointers that is used to manage the contents of write request queue 223. The write acknowledged entry pointer can be used to reference the queue entry for the oldest write request in write request queue 223 that has not received acknowledgments for all of its associated data blocks. The write acknowledged entry pointer can be used by buffer manager 260 in order to determine an endpoint for the delete process described in further detail below.

Additionally, once acknowledgements have been received from each of the SSDs for a write request, write module 258 may generate a response 295 (e.g., a new Ethernet packet having the above identified format). Write module 258 may then encapsulate the completion notification into the response 295. For example, write module 258 may generate an Ethernet packet with a transport header indicating the MAC addresses of the requesting host device and of the I/O controller 250. The Ethernet packet may also include in its payload a protocol header identifying a completion notification I/O command (also referred to as a response I/O command) and may include a command payload for the completion notification that identifies the specific I/O command that has completed. Write module 258 may then send the response 295 to the host.

Responsive to receipt of a read command, I/O manager 255 invokes read module 257. Read module 257 is responsible for responding to read commands. In one embodiment, the command payload of the read command identifies specific logical block addresses of a virtual storage device (e.g., a virtual NVMe drive) from which data is to be read. For example, the command payload may identify a particular logical block address and a length. Read module 257 may use virtual drive map 220 for the virtual drive to determine what locations (e.g., what SSD pages) on the SSDs correspond to the logical block addresses of the virtual drive.

Responsive to a read request, read module 257 may determine if there is a data block in buffer 222 associated with the logical address specified by the read request (e.g., as a result of a previous write request to the same logical address). Read module 257 may access the mapping table (e.g., virtual drive map 220) to identify a table entry that includes the logical address specified by the read request, and determine whether there is a data block associated with that logical address stored in buffer 222. If so, I/O controller 108A-Y may then determine the location of the associated data block in buffer 222 using the contents of the table entry, and retrieve the data block from buffer 222. Read module 257 may return a response 295 to the read request received from the host using the data block retrieved from the buffer.

In some implementations, the read request may specify a starting logical address and an amount of data to be read (e.g., a data length) that spans multiple data blocks. Read module 257 may determine the logical addresses associated with each data block to complete the read request (e.g., using the page sizes for the destination SSDs). For example, read module 257 may receive a read request for 40 kilobytes of data starting at a particular logical address. If the data block size is 4 kilobytes (based on a 4 kB page size for the SSD), read module 257 may determine the logical addresses for each of the 4 kB data blocks using the logical address specified in the read request as a starting point. Read module 257 may then complete the read operation for each of the 4 kB data blocks by first accessing virtual drive map 220 with the applicable logical address, and if the associated data block is present in the buffer, utilize the data block from buffer 222 to construct a response to be returned to the host.

If read module 257 determines that a data block associated with a logical address specified by a read request is not present in buffer 222, read module 257 may then generate a read command 270 for the SSD storing data to be read. Read module 257 may utilize the physical address stored in virtual drive map 220 to identify the target SSD and send a read command to that SSD. Similarly, if read module 257 receives a read request for multiple data blocks and only some of those data blocks are present in buffer 222, read module 257 may retrieve any data blocks in the buffer and send read commands to the applicable SSDs for any data blocks not stored in the buffer. Read module 257 may then construct a response to be returned to the host with the combination of the buffered data and the data returned from the SSDs.

For example, if three data blocks are not present in buffer 222 that are needed to satisfy a read request, read module 257 may determine a first page on a first SSD storing requested information, a second page on a second SSD storing requested information, and a third page on a third SSD storing requested information. Read module 257 may then generate a first read command directed to the first page of the first SSD, a second read command directed to the second page of the second SSD, and a third read command directed to the third page of the third SSD. The read commands may be placed into I/O submission queues 280 for each of the SSDs that are managed by the I/O manager 255. Once a read command reaches the front of an I/O submission queue 280, read module 257 may then send the generated read command to the appropriate drive.

The SSDs receive the read commands and return data stored at indicated memory locations. The returned data is added to a data send buffer by read module 257 until the data send buffer fills or all requested data has been received. In one embodiment, the data send buffer has a size that corresponds approximately to a maximum allowed size of an Ethernet packet. Once the data send buffer fills, read module 257 may generate a response message 290 (e.g., a new Ethernet packet having the above identified format). Read module 257 may then encapsulate the data from the data send buffer into the response 295. For example, read module 257 may generate an Ethernet packet with a transport header indicating the MAC addresses of the requesting host device and of the I/O controller 250. The Ethernet packet may also include in its payload a protocol header identifying a Data-In I/O command, may include a command payload for the Data-In I/O command and/or may include a data payload with the data from the data send buffer 221. Read module 257 may then send the response 295 to the host.

Read module 257 may continue to create and send responses incorporating retrieved data as the data send buffer fills. Once all of the data has been retrieved, a final response 295 may include in its protocol header a command ID for a completion notification. The completion notification may notify the host that all data has been retrieved and that the requested read command has been satisfied. Additionally, as specific read commands sent to the drives are satisfied by the drives, read module 257 may place those read commands into a host completion queue on the host (not pictured).

I/O controller 250 may additionally include buffer manager 260 that can minimize latency in responding to read requests from hosts (by reducing the number of read commands sent to SSDs). In some implementations, buffer manager 260 may include a buffer size monitor 261, a data block delete module 262, a queue entry delete module 263, and a queue pointer manager 264. Alternatively, the buffer size monitor 261, data block delete module 262, queue entry delete module 263, and queue pointer manager 264 may be distinct modules that are separate from buffer manager 260. In one embodiment, buffer manager 260 corresponds to a buffer manager 109A-Y of FIG. 1.

Once write module 257 adds data blocks to buffer 222, buffer manager 260 can maintain the data blocks in buffer 222 until a combined size of all data blocks in buffer 222 is equal to or greater than a high threshold. Buffer manager 260 can invoke buffer size monitor 261 to determine the buffer size relative to the high threshold each time a write request adds data blocks to buffer 222. If the size of the buffer meets the high threshold, buffer manager 260 may invoke data block delete module 263 to begin deleting data blocks from buffer 222 until the combined size of all data blocks in the buffer is equal to or below a low threshold.

As noted above, the high threshold may be based on a number of available SSDs and the block size associated with those SSDs. Some SSDs additionally include multiple silicon dies, each die containing several SSD blocks. An SSD may be limited to a single I/O operation on each die at a time. Accordingly, while a read or write operation is performed on any page in a die, other read and write operations associated with pages in the die are delayed. Buffer manager 260 may set a maximum buffer size to the number of SSDs, multiplied by the SSD block size, and further multiplied by the number of dies associated with the SSDs. In one embodiment, this information may be stored in drive configuration data 221. Buffer manager 260 may access drive configuration data 221 to determine the applicable attributes associated with the available SSDs and calculate the maximum buffer size. Alternatively, the maximum buffer size may be initially set using a benchmarking component of the storage server (not pictured) and stored in the drive configuration data 224. The benchmarking may also be performed by an external device, and results of the benchmarking may be stored in the drive configuration data 224.

Buffer manager 260 may set the high threshold to a value that is a predetermined percentage below the maximum buffer size. Buffer manager 260 may set the low threshold to a value that is a predetermined percentage below the high threshold. The high and low threshold values may be determined by the benchmarking and stored in configuration data 224 for use by buffer size monitor 261. Alternatively, buffer manager 260 may monitor storage usage of available SSDs and compute the high and low threshold values based on observed usage of the SSDs. In an illustrative example, the high threshold value may be set to 75% of the maximum buffer size, and the low threshold may be set to 50% of the maximum buffer size.

After each write request is completed by write module 258, buffer manager 260 may invoke buffer size monitor 261 to determine the current size of buffer 222, where the current size is the combined size of all data blocks stored in buffer 222. If the current size of buffer 222 is equal to or greater than the high threshold value, buffer size monitor may invoke data block delete module 262 to delete one or more data blocks from buffer 222 until the size of buffer 222 is equal to or less than the low buffer threshold. To identify data blocks in buffer 222 that may be eligible for deletion, data block delete module 262 may first determine the oldest queue entry in write request queue 223.

In one embodiment, the oldest queue entry is the entry that has been stored in the write request queue 223 for a period of time that is greater than that of any other entry in the queue. For example, in a FIFO queue, the oldest entry will be at the head of the queue (and thus, the "first out" of the queue). Data block delete module 262 may identify the oldest entry by identifying the entry associated with the oldest entry pointer in queue pointers 224.

To determine if any of the data blocks associated with the oldest entry in the queue are eligible for deletion, data block delete module 262 may check the acknowledgment status for the associated data blocks to ensure that the data has been successfully written to an SSD. In one embodiment, data block delete module 262 may compare the entry associated with the oldest entry pointer to the entry associated with the write-acknowledged pointer in queue pointers 224. As noted above, the write-acknowledged pointer can reference the oldest entry in write request queue 223 that has not received all of its acknowledgments, and thus any "older" write request in the queue have received acknowledgments for all associated data blocks. Data block delete module 262 may then delete all the data blocks associated with the oldest entry if necessary.

Data block delete module 262 may first select at least one data block associated with the oldest entry in the queue. In some implementations, where the queue entry is associated with multiple data blocks, data block delete module 262 may select the "last" data block written (e.g., the last in a list of blocks associated with the queue entry). Alternatively, data block delete module 262 may select the "first" data block written (e.g., the first in a list of blocks associated with the queue entry). Data block delete module 262 may then delete the selected data block from the buffer 222 and update the virtual drive map 220 to remove any reference for the associated logical address to a data buffer location.

In one embodiment, to determine if any of the data blocks associated with the oldest entry in the queue are eligible for deletion, data block delete module 262 may check the acknowledgment status for the associated data blocks individually rather than using the write-acknowledged pointer. This may be performed, for example, if the oldest entry pointer and the write-acknowledge pointer point to the same entry. Once a data block associated with the oldest entry has been selected, data block delete module 262 may check the acknowledgment status of the selected data block to determine whether the associated write command has been acknowledged. If so, data block delete module 262 may delete the selected data block from the buffer 222 and update virtual drive map 220 to remove any reference for the associated logical address to a data buffer location. Otherwise, buffer manager 109A-Y may select the next data block associated with the queue entry.

After data block delete module 262 deletes the selected data block, buffer size monitor 261 may then recheck the size of buffer 222 and repeat the process until the size of the buffer is equal to or less than the low threshold. Alternatively, buffer size monitor 261 may specify an amount of data to delete when invoking data block delete module 262, causing data block delete module 262 to continue deleting data blocks until the specified amount of data has been deleted from buffer 222, or there are no eligible data blocks remaining that may be deleted.

If all of the data blocks associated with the oldest entry in the queue have been deleted from the buffer, buffer manager 260 may invoke queue entry delete module 263 to remove the oldest entry from the queue. Queue pointer manager 264 may additionally be invoked to update the oldest entry pointer in queue pointers 224 to reference the "new oldest" entry in the queue (e.g., the entry in the queue that has been in the queue longer than any other entry still maintained in the queue). If the low threshold has not yet been met, buffer manager 260 may select the next eligible entry in the queue (the "new oldest" entry) and repeat the process until the low threshold is met or no data blocks are present in the buffer that are eligible for deletion.

In one embodiment, the delete process may continue checking queue entries until it reaches the queue entry that is referenced by the write-acknowledged pointer in queue pointers 224. As noted above the write-acknowledged pointer may reference the oldest entry in write request queue 223 that has not received all of its acknowledgments, and thus any "newer" write request in the queue is not likely to have data blocks eligible for deletion. In an alternative embodiment, if the queue entry referenced by the write-acknowledged pointer has any acknowledged data blocks, only the acknowledged data blocks may be deleted, leaving the unacknowledged data blocks in buffer 222.

Figure 3:
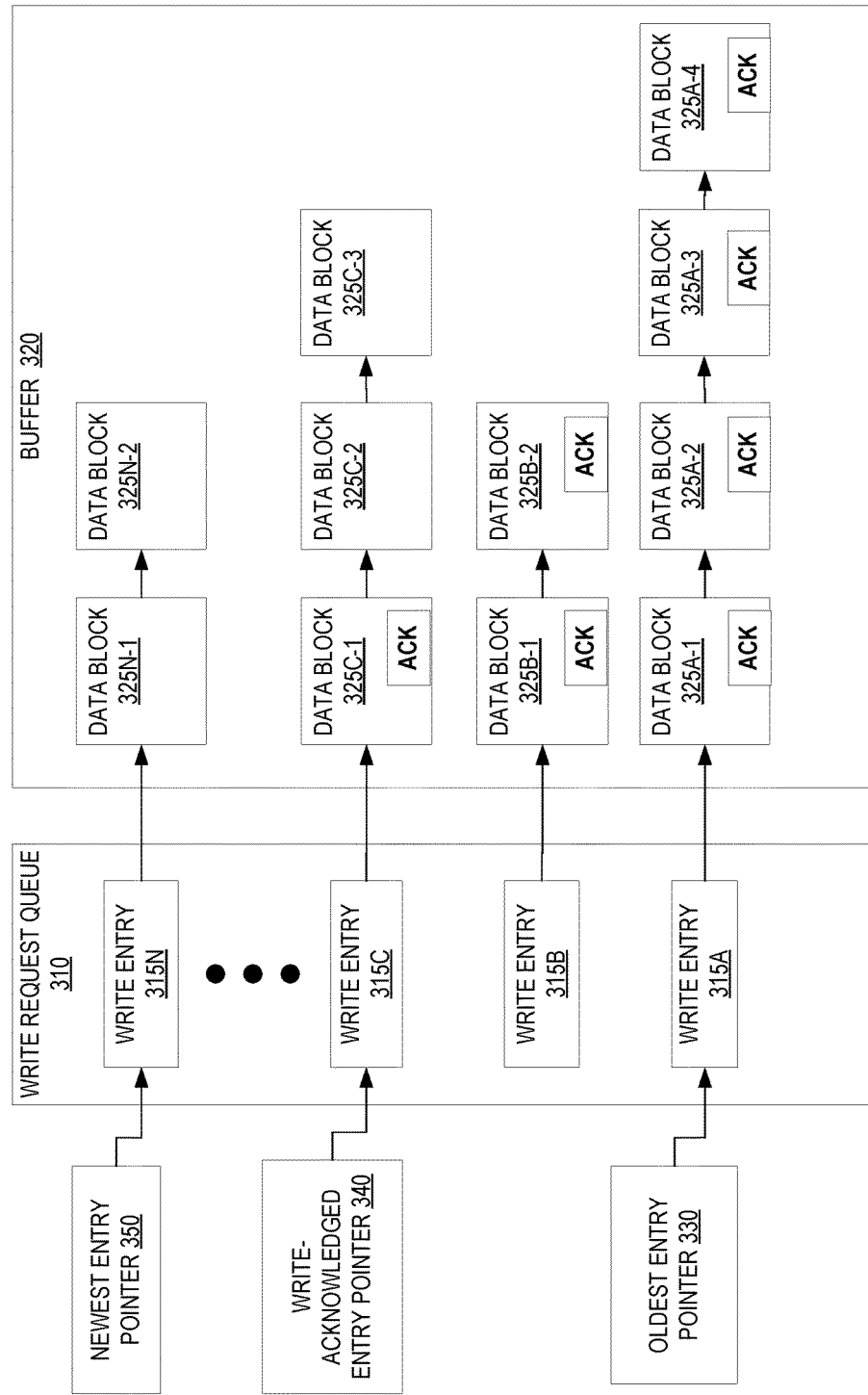
FIG. 3 is a block diagram of one embodiment of a write request queue, queue pointers, and associated buffer of an I/O controller.

FIG. 3 is a block diagram of one embodiment of a write request queue 310, queue pointers 330-350, and associated buffer 320 of an I/O controller. In one embodiment, write request queue 310 corresponds to write request queue 223 of FIG. 2, queue pointers 330-350 correspond to queue pointers 224 of FIG. 2, and buffer 320 corresponds to buffer 222 of FIG. 2.

As shown in FIG. 3, write request queue 310 includes write entries 315A-N. Although, for simplicity, only four write entries are shown, it should be understood that write request queue 310 may include more or fewer than four entries. Each write entry 315A-N represents an entry added to write request queue 310 upon receipt of a write request by an I/O controller as described above with respect to FIGS. 1-2. Write entry 315A depicts the queue entry for the first write request received and stored in write request queue 310. Write entry 315A is thus the "oldest" entry in write request queue 310. Accordingly, oldest entry pointer 330 refers to write entry 315A. Similarly, write entry 315N depicts the queue entry for the most recently received write request. Thus, it represents the "newest" entry in write request queue 310, and is referenced by newest entry pointer 350.

Each write entry 315A-N includes a reference pointer to associated data blocks 315A-N in buffer 320. Each of the data blocks 325A-N includes an acknowledgment status indicator as well as a reference to the next data block associated with the corresponding write entry. Write entry 315A references four data blocks (325A-1, 325A-2, 325A-3, and 325A-4), each of which have an acknowledgment status that indicates the data blocks were acknowledged by an SSD. Similarly, write entry 315B references two data blocks (325B-1 and 325B-2), that were both acknowledged by an SSD. Write entry 315C references three data blocks (325C-1, 325C-2, and 325C-3), one that was acknowledged by an SSD (325C-1) and two that have not yet been acknowledged. Write-acknowledged entry pointer 340 references write entry 315C since this is the oldest entry in write request queue 310 that has not received acknowledgements for all of its associated data blocks. Write entry 315N references two data blocks (325N-1 and 325N-2), that have not yet been acknowledged.

When an I/O controller, as described above with respect to FIGS. 1-2, determines that the size of buffer 320 has met or exceeded a threshold, the I/O controller may identify the oldest entry in write request queue 310 by accessing oldest entry pointer 330. The I/O controller may then identify the data blocks associated with write entry 315A using the reference(s) included in the queue entry. All of the data blocks associated with write entry 315A have been acknowledged, so four all are eligible for deletion. In one embodiment, the I/O controller may start deleting with the last data block (data block 325A-4). Alternatively, the I/O controller may start with the first data block (325A-1). Once all four have been deleted, the I/O controller may then remove write entry 315A from write request queue 310 and update oldest entry pointer 330 to refer to write entry 315B.

The I/O controller may repeat the process for write entry 315B, and since both data blocks 325B-1 and 325B-2 have been acknowledged, they may both also be deleted. The I/O controller may then remove write entry 315B from write request queue 310 and update oldest entry pointer 330 to refer to write entry 315C. In some implementations, the I/O controller may terminate the delete process since the oldest entry in write request queue 310 is also referenced by write-acknowledged entry pointer 340. Alternatively, the I/O controller may continue and only delete data block 325C-1 since that is the only data block associated with write entry 315C that has been acknowledged. In some implementations, the I/O controller may store a single write entry for a group of blocks to reduce the storage used to manage the data blocks for a write. In such cases, the I/O controller may delete some data blocks but retain enough information to compute the addresses of the valid blocks that remain. Thus, when the I/O controller determines that data block 325C-1 may be deleted, the data may be deleted, but the address reference information that connected data block 325C-1 to data block 325C-2 may be retained. For example, the address of 325C-1 in write entry 315C may be replaced with the address of 325C-2. Alternatively, the data from data block 325C-1 may be deleted, but the address information that connects data block 325C-1 to data block 325C-2 may remain.

FIGS. 4-9 are flow diagrams of various implementations of methods related to providing consistent reduced latency for SSDs. The methods are performed by processing logic that may include hardware (circuitry, dedicated logic, etc.), software (such as is run on a general purpose computer system or a dedicated machine), or a combination of both. Some methods may be performed by a buffer manager such as buffer managers 109A-Y of FIG. 1, or buffer manager 260 of FIG. 2. Some methods may be performed by an I/O controller such as any I/O controller 108A-Y of FIG. 1, or I/O controller 250 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 4:
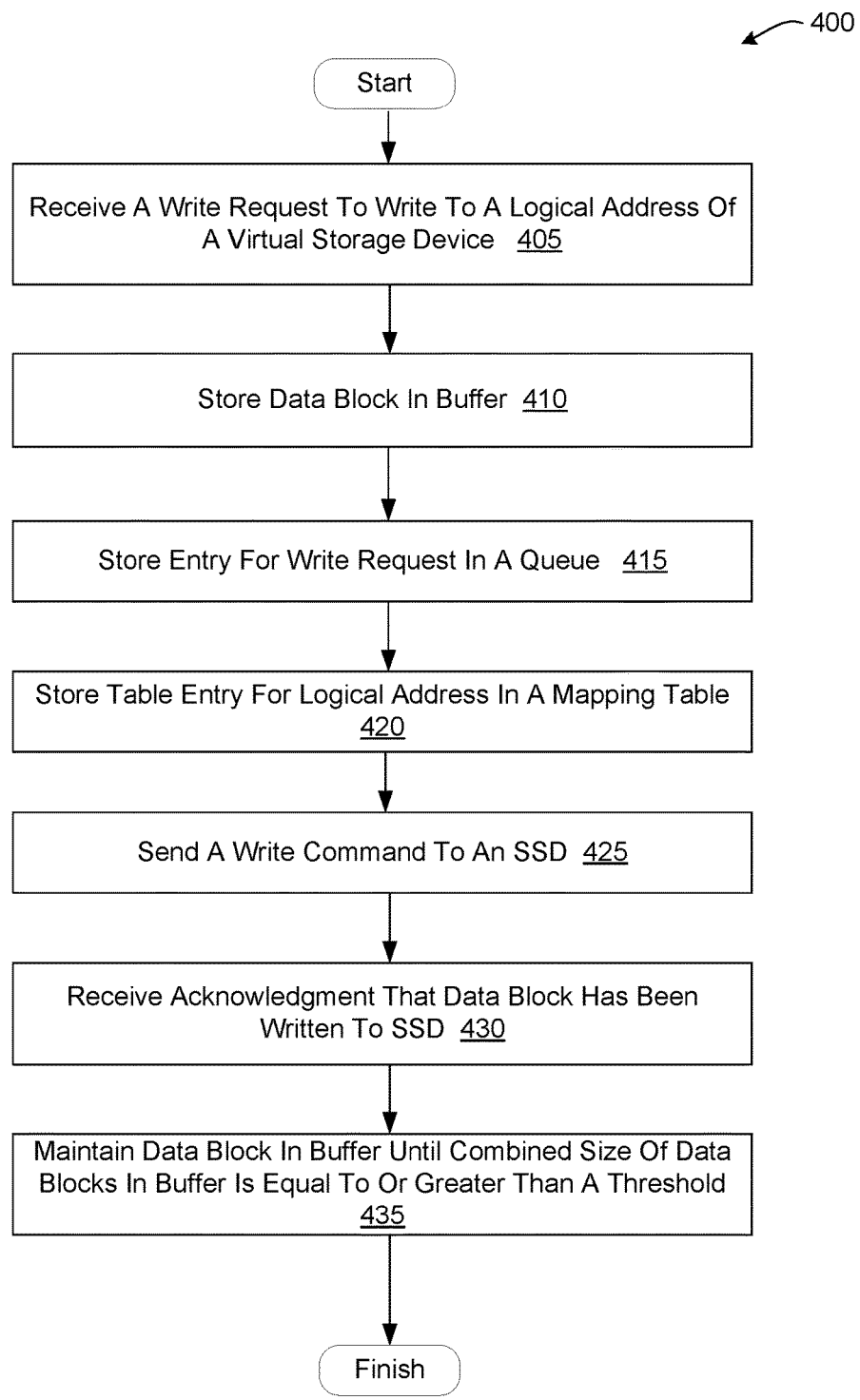
FIG. 4 is a flow diagram of one embodiment for a method of minimizing read latency for solid state drives.

FIG. 4 is a flow diagram of one embodiment for a method 400 of minimizing read latency for solid state drives. Method 400 may be performed, for example, by an I/O controller. At block 405 of method 400, processing logic receives a write request to write to a logical address of a virtual storage device that is mapped to a plurality of SSDs. The write request may include the logical address of the virtual storage device and may be associated with one or more data blocks to be written. At block 410, processing logic stores a first data block in a buffer. In one embodiment, processing logic may receive the first data block as part of the request received at block 405. Alternatively, processing logic may retrieve the first data block separately from receipt of the request.

At block 415, processing logic stores an entry for the write request in a queue of write requests. The queue entry can include the starting logical block address for the write request, the total number of data blocks to write, the total size of the write (e.g., in kilobytes, megabytes, etc.), or other similar information. The queue entry may also include a reference to the data blocks stored in the buffer that are associated with the write request. In one embodiment, the queue entry may include the location address of the data blocks associated with the write request in the buffer. In another embodiment, the queue entry may include pointers to the data blocks in the buffer associated with the write request. In another embodiment, the queue entry may reference the associated data blocks using a linked list style data structure, where the queue entry includes a reference to the first data block, the first data block include a reference to a second data block, the second data block includes a reference to a third data block, and so on.

At block 420, processing logic stores a table entry for the logical address in a mapping table. In some embodiments, the table entry may include the logical address of the data block, the physical address of the SSDs to which the data from the data block will be written, the location address of the data block in the buffer (e.g., an address, pointer, etc.), or any similar information. At block 425, processing logic sends a write command to an SSD, where the write command includes the data block from block 410.

At block 430, processing logic receives an acknowledgment that the data block has been written to the SSD. For each acknowledgement received, processing logic may set an acknowledgment status associated with the applicable data block in the buffer to indicate that the write command for that data block has completed. The acknowledgement status may be stored as part of the data block in the buffer, in a separate data structure that is associated with the data block (e.g., via a pointer or address location), or in any similar manner.

At block 435, processing logic maintains the data block in the buffer until the combined size of all data blocks in the buffer is equal to or greater than a threshold. In some embodiments, the high threshold may be based on a number of available SSDs and the block size associated with those SSDs. In some implementations, the threshold value may be set as described below with respect to FIG. 9. In some implementations, data blocks may be deleted from the buffer as described below with respect to FIG. 8. After block 425, the method of FIG. 4 terminates.

Figure 5:
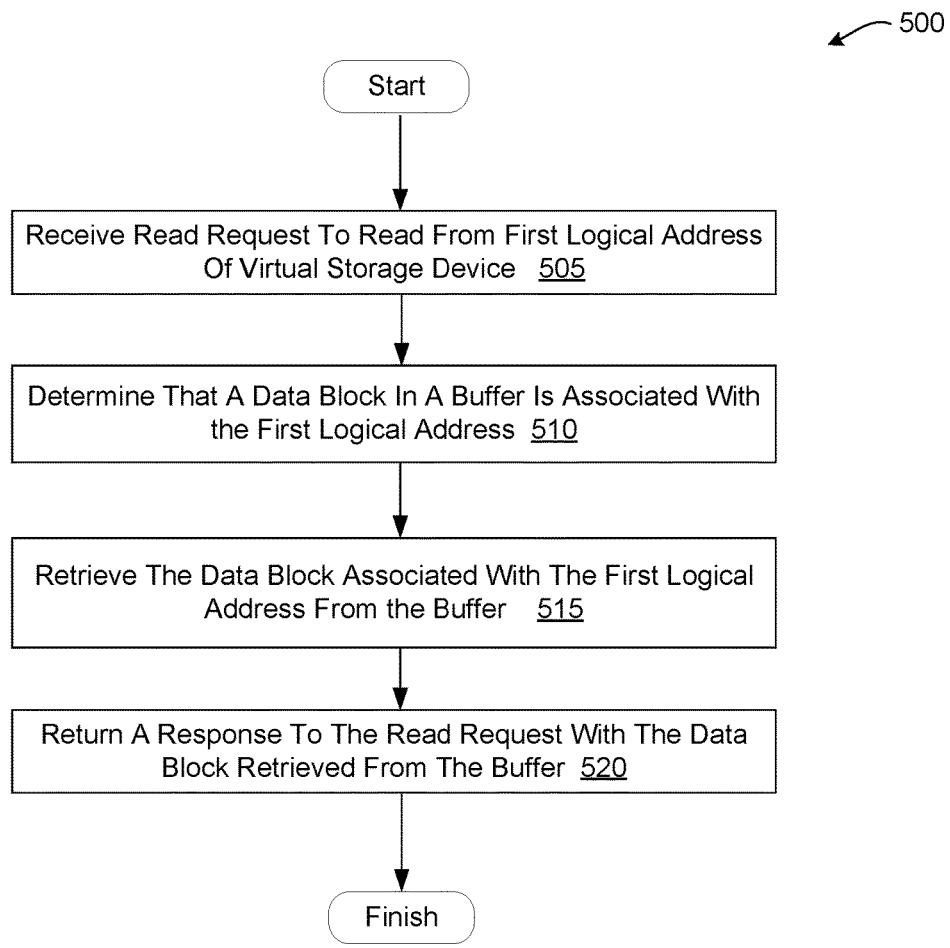
FIG. 5 is a flow diagram of one embodiment for a method of responding to a read request with data from a buffer.

FIG. 5 is a flow diagram of one embodiment for a method 500 of responding to a read request with data from a buffer. Method 500 may be performed, for example, by an I/O controller. At block 505 of method 500, processing logic receives a read request to read from a logical address of a virtual storage device. At block 510, processing logic determines that a data block in a buffer is associated with the logical address from block 505. At block 515, processing logic retrieves the data block associated with the logical address from the buffer. At block 520, processing logic returns a response to the read request received at block 505 with the data block retrieved from the buffer. After block 520, the method of FIG. 5 terminates.

Figure 6:
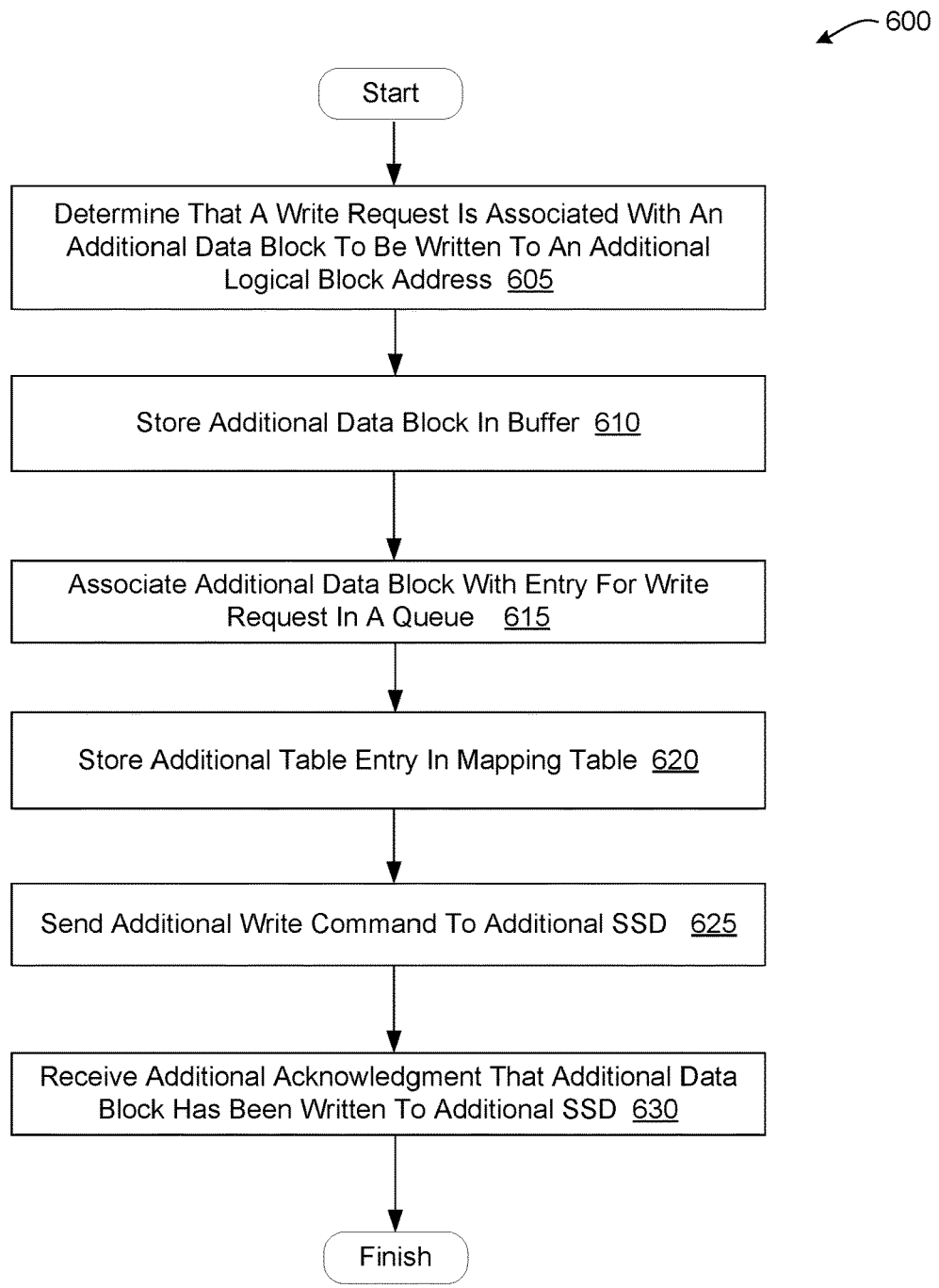
FIG. 6 is a flow diagram of one embodiment for a method of adding an additional data block associated with a write request to a buffer.

FIG. 6 is a flow diagram of one embodiment for a method 600 of adding an additional data block associated with a write request to a buffer. Method 600 may be performed, for example, by an I/O controller. At block 605 of method 600, processing logic determines that a write request is associated with an additional data block to be written to an additional logical block address. At block 610, processing logic stores the additional data block in a buffer. At block 615, processing logic associates the additional data block with an entry for the write request in a queue. At block 620, processing logic stores an additional table entry in a mapping table. At block 625, processing logic sends an additional write command to an additional SSD. At block 630, processing logic receives an additional acknowledgment that the additional data block has been written to the additional SSD. After block 630, the method of FIG. 6 terminates.

Figure 7:
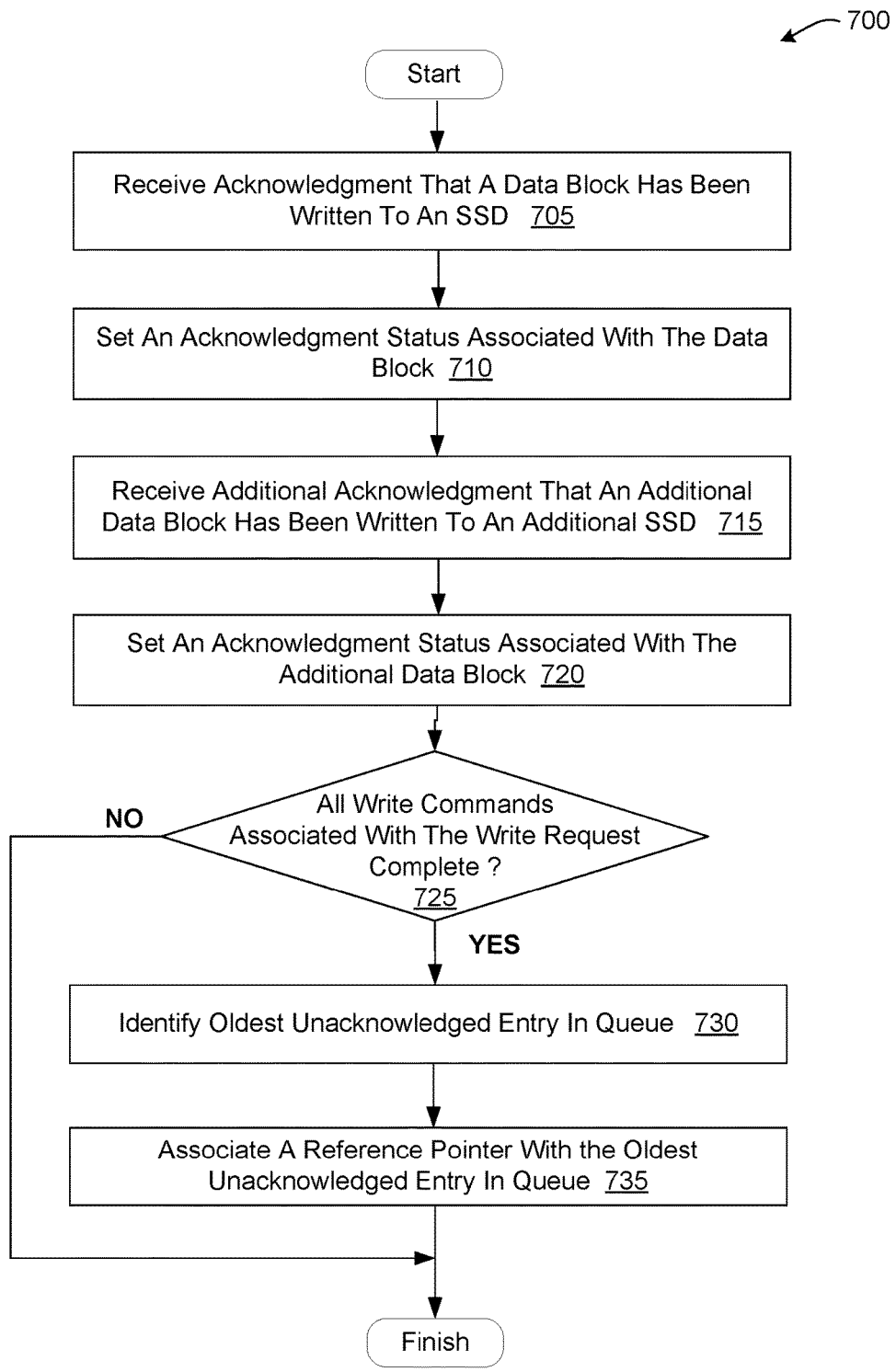
FIG. 7 is a flow diagram of one embodiment for a method of updating a reference to an oldest unacknowledged entry in a queue.

FIG. 7 is a flow diagram of one embodiment for a method 700 of updating a reference to an oldest unacknowledged entry in a queue. Method 700 may be performed, for example, by an I/O controller. At block 705 of method 700, processing logic receives an acknowledgment that a data block has been written to an SSD. At block 710, processing logic sets an acknowledgment status associated with the data block. At block 715, processing logic receives an additional acknowledgment that an additional data block has been written to an additional SSD. At block 720, processing logic sets an acknowledgment status associated with the additional data block.

At block 725, processing logic determines whether all write commands associated with a write request have completed. If so, processing continues to block 730. Otherwise, the method of FIG. 7 terminates. At block 730, processing logic identifies the oldest unacknowledged entry in a queue of write requests. At block 735, processing logic associates a reference pointer with the oldest unacknowledged entry in the queue of write requests. After block 735, the method of FIG. 7 terminates.

Figure 8:
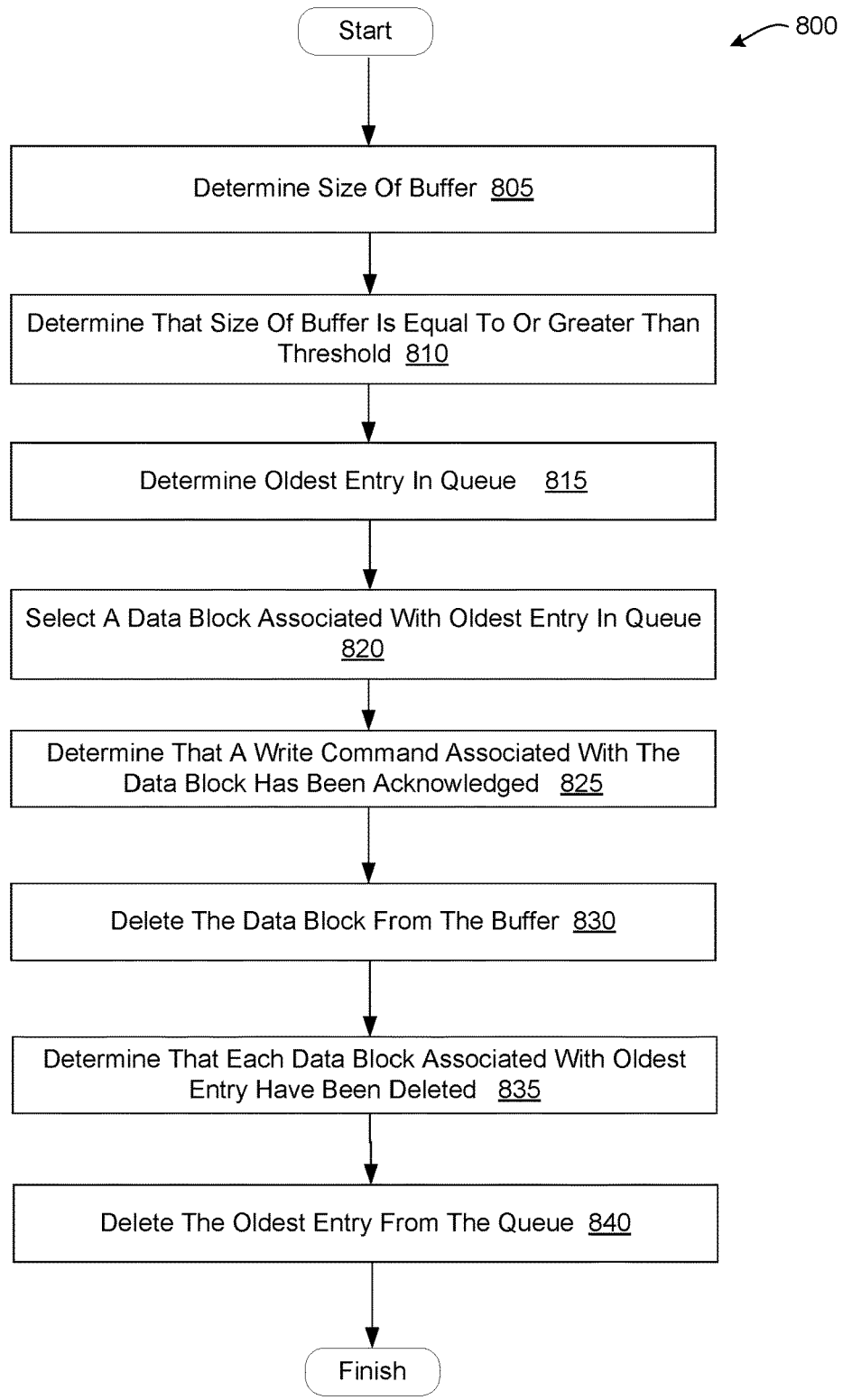
FIG. 8 is a flow diagram of one embodiment for a method of deleting a data block from a buffer.

FIG. 8 is a flow diagram of one embodiment for a method 800 of deleting a data block from a buffer. Method 800 may be performed, for example, by a buffer manager of an I/O controller. At block 805 of method 700, processing logic determines the size of a data buffer. At block 810, processing logic determines that the size of the buffer is equal to or greater than a threshold. At block 815, processing logic determines the oldest entry in a queue of write requests. At block 820, processing logic selects a data block associated with the oldest entry in the queue of write requests.

At block 825, processing logic determines that a write command associated with the data block has been acknowledged. At block 830, processing logic deletes the data block from the buffer. At block 835, processing logic determines that each data block associated with the oldest entry in the queue have been deleted. At block 840, processing logic deletes the oldest entry from the queue of write requests. After either block 830 or block 835, the method of FIG. 8 terminates.

Figure 9:
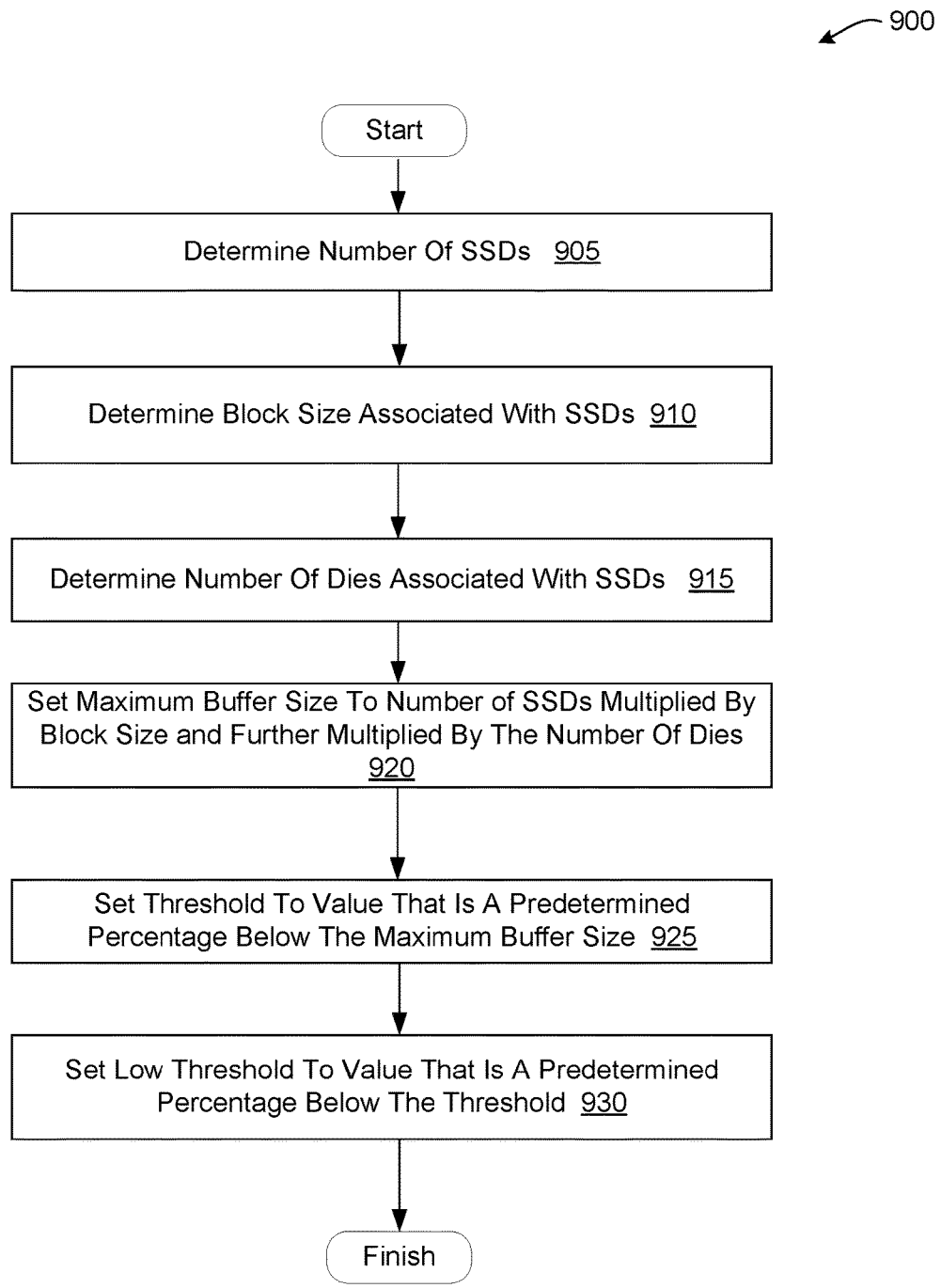
FIG. 9 is a flow diagram of one embodiment for a method of setting threshold hold values for a buffer manager.

FIG. 9 is a flow diagram of one embodiment for a method 900 of setting threshold hold values for a buffer manager. Method 900 may be performed, for example, by a buffer manager of an I/O controller. At block 905 of method 900, processing logic determines a number of SSDs available to an I/O controller. At block 910, processing logic determines a block size associated with the SSDs. At block 915, processing logic determines a number of dies associated with the SSDs.

At block 920, processing logic sets a maximum buffer size to the number of SSDs determined at block 905 multiplied by the block size determined at block 910, and further multiplied by the number of dies determined at block 915. At block 925, processing logic sets a threshold to a value that is a predetermined percentage below the maximum buffer size. At block 930, processing logic sets a low threshold that is a predetermined percentage below the threshold determined at block 925. After block 930, the method of FIG. 9 terminates.

Figure 10:
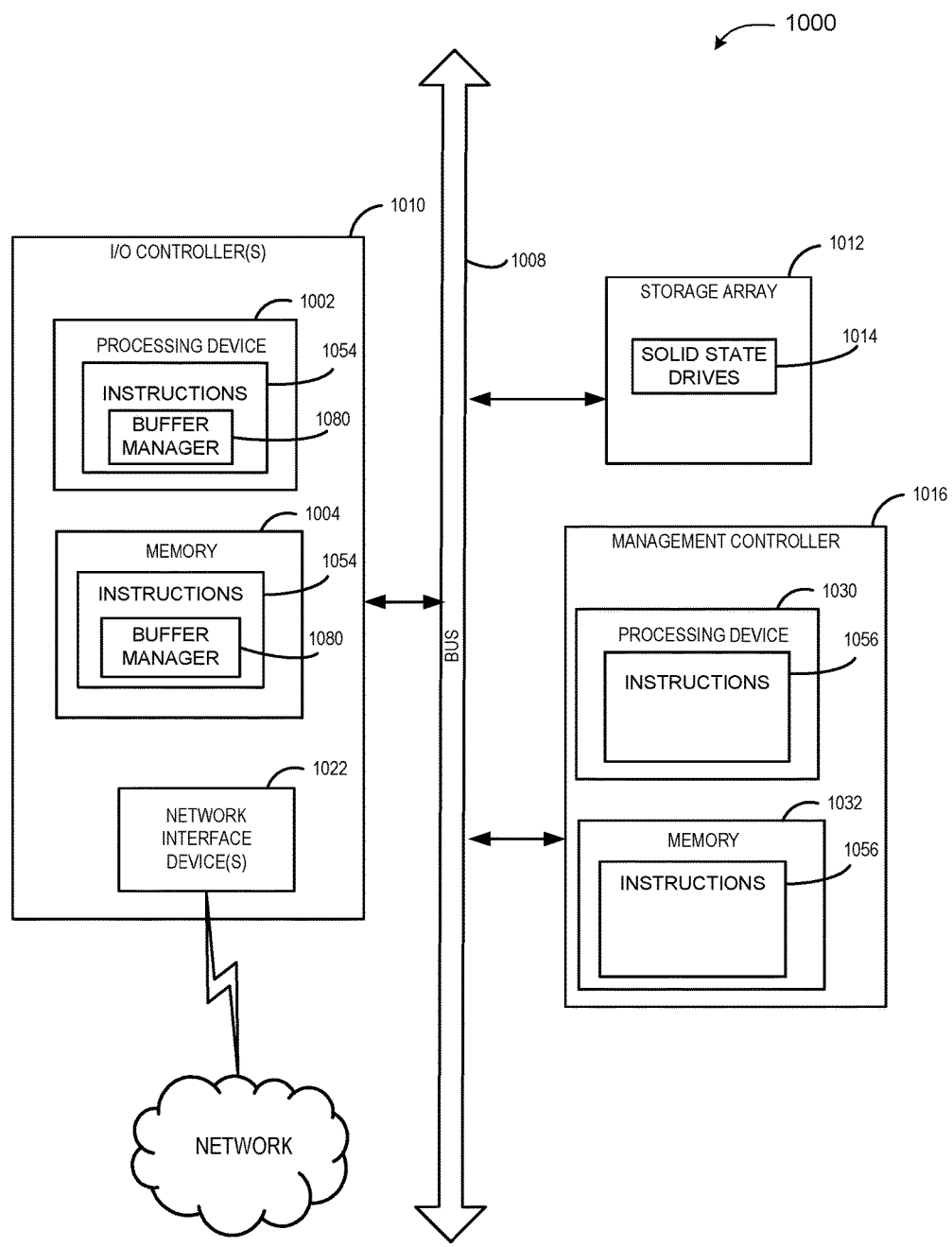
FIG. 10 illustrates an example computing device, in accordance with one embodiment.

FIG. 10 illustrates a diagrammatic representation of a machine in the example form of a computing device 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a hardware storage server, and may provide storage to hosts using one or more of a storage area network (SAN) or network attached storage (NAS) methodology. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1000 includes one or more I/O controllers 1010, a storage array 1012, and a management controller 1016 (or multiple management controllers 1016), which communicate with each other via a bus 1008. Bus 1008 may include one or more switches (e.g., switch 110 of FIG. 1) and one or more storage fabrics (also referred to as backplane fabrics). Each storage fabric includes hardware (e.g., switches, etc.) that connects I/O controllers 1010 to SSDs 1014. Each storage fabric may include a fabric board (e.g., a printed circuit board (PCB) that includes multiple hardware components. Alternately, multiple storage fabrics may be part of a single backplane printed circuit board (PCB). Each storage fabric enables any I/O controller 1010 to connect to any SSD 1014. Each storage fabric may be independent of other storage fabrics, using its own hardware, ports, connections, etc. that are distinct from those used by the other storage fabrics. Accordingly, if any component n a storage fabric fails and causes that storage fabric to fail, the I/O controllers 1010 may continue to maintain connections to the SSDs 1014 via an alternative storage fabric.

Each I/O controller 1010 represents a device configured to connect one or more host computing devices to one or more SSDs (e.g., I/O controller 108A-Y of FIG. 1). An I/O controller 1010 includes a processing device 1002, and a memory 1004 (e.g., read-only memory (ROM), flash memory, dynamic random access memory (DRAM) such as synchronous DRAM (SDRAM) or Rambus DRAM (RDRAM), etc.). The I/O controller 1010 may further include one or more network interface devices 1022 to connect to a network. In one embodiment, each I/O controller 1010 is a system on a chip (SoC) including processing device 1002, memory 1004, and one or more network interface devices 1022.

Management controller 1016 represents a device configured to manage a storage fabric. Management controller 1016 may include a memory 1032 having instructions 1056 and a processing device 1030 that loads and executes those instructions 1056. Memory 1032 may be read-only memory (ROM), flash memory, dynamic random access memory (DRAM) such as synchronous DRAM (SDRAM) or Rambus DRAM (RDRAM), etc. In one embodiment, management controller 1016 is a system on a chip (SoC) including processing device 1030 and memory 1032.

Processing device 1002 and/or processing device 1030 represents one or more general-purpose processors such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute processing logic (e.g., instructions 1054) for performing operations discussed herein.

The memory 1004 may be a machine-readable storage medium (or more specifically a computer-readable storage medium) on which is stored one or more sets of instructions 1054 embodying any one or more of the methodologies or functions described herein. The instructions 1054 may also reside, completely or at least partially, within the processing device 1002 during execution thereof by the I/O controller 1010, the processing device 1002 also constituting computer-readable storage media. Alternatively, or additionally, the instructions 1054 may be resident on a solid state storage drive (e.g., a solid state storage drive 1014) and/or a hard disk drive connected to bus 1008.

The instructions may include a buffer manager 1080 (as described above with respect to FIG. 2 and FIGS. 4-9), and/or a software library containing methods that call a buffer manager 1080. While the computer-readable storage medium is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The storage array 1012 represents a device that contains a group of solid state drives (SSDs) 1014. Storage array 1012 may arrange SSDs 1014 into logical redundant storage containers, or a redundant array of independent disks (RAID). The storage array 1012 may distribute data across the SSDs 1014 in one of several RAID levels to provide different levels of redundancy and performance. In some implementations, storage array 1012 may include one group of SSDs 1014 for data and another group of SSDs 1014 for recovery purposes. SSDs 1014 may be SAS/SATA drives, non-volatile memory express (NVMe) drives, small computer system interface (SCSI) over PCIe (SOP) drives, or solid state drives that communicate using different protocols. The number of SSDs 1014 included in storage array 1012 may be less than 10 to more than 100. The SSDs 1014 may have the same or different storage capacities.

The management controller 1016 may be a device configured to perform particular operations with regards to management of the array of SSDs 1014 in storage array 1012. Management controller 1016 may include a volatile and/or non-volatile memory to store one or more sets of instructions 1054 embodying any one or more of the methodologies or functions described herein.

The modules, components and other features described herein (for example in relation to FIG. 2) can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "sending", "maintaining", "returning", "determining", "setting", "associating", or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" shall also be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a processing device of a storage server coupled to a plurality of solid state storage devices (SSDs), a write request to write to a first logical address of a virtual storage device that is mapped to the plurality of SSDs, wherein the write request comprises the first logical address and is associated with a first data block;
    storing, by the processing device, the first data block in a buffer, wherein the first data block is one of a plurality of data blocks in the buffer;
    storing, by the processing device, an entry for the write request in a queue, the entry comprising a reference to the first data block in the buffer;
    sending, by the processing device, a first write command to a first SSD of the plurality of SSDs, the first write command comprising the first data block;
    receiving, by the processing device, an acknowledgment that the first data block has been written to the first SSD;
    maintaining the first data block in the buffer until a combined size of the plurality of data blocks in the buffer is equal to or greater than a threshold, the threshold being based on a number of SSDs in the plurality of SSDs and a block size of the plurality of SSDs;
    determining a size of the buffer, wherein the size of the buffer comprises the combined size of the plurality of data blocks in the buffer;
    determining that the size of the buffer is equal to or greater than the threshold; and
    deleting one or more data blocks from the buffer until the size of the buffer is equal to or less than a low buffer threshold.

2. The method of claim 1, further comprising:
    storing a first table entry in a mapping table, the first table entry comprising the first logical address, a first physical address associated with the first SSD, and a location of the first data block in the buffer.

3. The method of claim 1, further comprising:
    receiving a read request to read from the first logical address of the virtual storage device, wherein the read request is received after receiving the write request;
    determining that the first data block in the buffer is associated with the first logical address;
    retrieving the first data block associated with the first logical address from the buffer; and
    returning a response to the read request, wherein the response to the read request comprises the first data block retrieved from the buffer.

4. The method of claim 3, wherein determining that the first data block in the buffer is associated with the first logical address comprises;
    identifying a first table entry in a mapping table that comprises the first logical address; and
    determining a location of the first data block in the buffer using the first table entry.

5. The method of claim 1, further comprising:
    determining an oldest entry of a plurality of entries in the queue, wherein the oldest entry is an entry that has been stored in the queue for a period of time that is greater than that of any other entry of the plurality of entries in the queue;
    selecting at least one data block of the plurality of data blocks associated with the oldest entry in the queue;
    determining that a write command associated with the at least one data block has been acknowledged; and
    deleting the at least one data block from the buffer.

6. The method of claim 5, further comprising:
    determining that each of the plurality of data blocks associated with the oldest entry have been deleted from the buffer; and
    removing the oldest entry from the queue.

7. The method of claim 1, further comprising:
    determining the number of SSDs in the plurality of SSDs;
    determining the block size associated with the plurality of SSDs;
    determining a number of dies associated with the plurality of SSDs;
    setting a maximum buffer size to the number of SSDs multiplied by the block size and further multiplied by the number of dies;
    setting the threshold to a value that is a predetermined percentage below the maximum buffer size; and
    setting the low buffer threshold to a value that is a predetermined percentage below the threshold.

8. A method comprising:
    receiving, by a processing device of a storage server coupled to a plurality of solid state storage devices (SSDs), a write request to write to a first logical address of a virtual storage device that is mapped to the plurality of SSDs, wherein the write request comprises the first logical address and is associated with a first data block;
    storing, by the processing device, the first data block in a buffer, wherein the first data block is one of a plurality of data blocks in the buffer;
    determining that the write request is associated with an additional data block to be written to an additional corresponding logical address;
    storing the additional data block in the buffer;
    storing, by the processing device, an entry for the write request in a queue, the entry comprising a reference to the first data block in the buffer;

associating the additional data block with the entry in the queue;
storing a first table entry in a mapping table, the first table entry comprising the first logical address, a first physical address associated with a first SSD of the plurality of SSDs, and a location of the first data block in the buffer;
storing an additional table entry in the mapping table, the additional table entry comprising the additional logical address, an additional physical address associated with an additional SSD of the plurality of SSDs, and an additional location of the additional data block in the buffer;
sending, by the processing device, a first write command to the first SSD, the first write command comprising the first data block;
receiving, by the processing device, an acknowledgment that the first data block has been written to the first SSD;
sending an additional write command to the additional SSD, the additional write command comprising the additional data block;
receiving an additional acknowledgment that the additional data block has been written to the additional SSD; and
maintaining the first data block in the buffer until a combined size of the plurality of data blocks in the buffer is equal to or greater than a threshold, the threshold being based on a number of SSDs in the plurality of SSDs and a block size of the plurality of SSDs.

9. The method of claim 8, further comprising:
setting an acknowledgement status associated with the first data block in the buffer to indicate that the first write command has completed;
setting the acknowledgment status associated with the additional data block in the buffer to indicate that the additional write command has completed; and
responsive to determining that each write command associated with the write request has completed,
identifying an oldest unacknowledged entry in the queue, wherein the oldest unacknowledged entry is an entry that is associated with at least one data block that has not been acknowledged and has been stored in the queue for a period of time that is greater than that of any other entry in the queue associated with data blocks that have not been acknowledged, and
associating a reference pointer with the oldest unacknowledged entry in the queue.

10. A system comprising:
one or more solid state storage devices (SSDs); and
an I/O controller coupled to the one or more SSDs via at least one of a switch or a bus, the I/O controller comprising a processing device that is to:
receive a write request to write to a first logical address of a virtual storage device that is mapped to the one or more SSDs, wherein the write request comprises the first logical address and is associated with a first data block;
store the first data block in a buffer, wherein the first data block is one of a plurality of data blocks in the buffer;
store a first table entry in a mapping table, the first table entry comprising the first logical address, a first physical address associated with a first SSD of the one or more SSDs, and a location of the first data block in the buffer;
store an entry for the write request in a queue, the entry comprising a reference to the first data block in the buffer;
send a first write command to the first SSD, the first write command comprising the first data block;
receive an acknowledgment that the first data block has been written to the first SSD;
maintain the first data block in the buffer until a combined size of the plurality of data blocks in the buffer is equal to or greater than a threshold, the threshold being based on a number of SSDs in the one or more SSDs and a block size of the one or more SSDs;
determine a size of the buffer, wherein the size of the buffer comprises the combined size of the plurality of data blocks in the buffer;
determine that the size of the buffer is equal to or greater than the threshold; and
delete one or more data blocks from the buffer until the size of the buffer is equal to or less than a low buffer threshold.

11. The system of claim 10, wherein the processing device is further to:
receive a read request to read from the first logical address of the virtual storage device, wherein the read request is received after receiving the write request;
determine that the first data block in the buffer is associated with the first logical address;
retrieve the first data block associated with the first logical address from the buffer; and
return a response to the read request, wherein the response to the read request comprises the first data block retrieved from the buffer.

12. The system of claim 11, wherein to determine that the first data block in the buffer is associated with the first logical address, the processing device is further to:
identify the first table entry in the mapping table that comprises the first logical address; and
determine the location of the first data block in the buffer using the first table entry.

13. The system of claim 10, wherein the processing device is further to:
determine an oldest entry of a plurality of entries in the queue, wherein the oldest entry is an entry that has been stored in the queue for a period of time that is greater than that of any other entry of the plurality of entries in the queue;
select at least one data block of the plurality of data blocks associated with the oldest entry in the queue;
determine that a write command associated with the at least one data block has been acknowledged;
delete the at least one data block from the buffer;
determine that each of the plurality of data blocks associated with the oldest entry have been deleted from the buffer; and
remove the oldest entry from the queue.

14. The system of claim 10, wherein the processing device is further to:
determine the number of SSDs in the one or more SSDs;
determine the block size associated with the one or more SSDs;
determine a number of dies associated with the one or more SSDs;
set a maximum buffer size to the number of SSDs multiplied by the block size and further multiplied by the number of dies;

set the threshold to a value that is a predetermined percentage below the maximum buffer size; and set the low threshold to a value that is a predetermined percentage below the threshold.

15. A system comprising:

a plurality of solid state storage devices (SSDs); and an I/O controller coupled to the plurality of SSDs via at least one of a switch or a bus, the I/O controller comprising a processing device that is to:

receive a write request to write to a first logical address of a virtual storage device that is mapped to the plurality of SSDs, wherein the write request comprises the first logical address and is associated with a first data block;

store the first data block in a buffer, wherein the first data block is one of a plurality of data blocks in the buffer;

store a first table entry in a mapping table, the first table entry comprising the first logical address, a first physical address associated with a first SSD of the plurality of SSDs, and a location of the first data block in the buffer;

determine that the write request is associated with an additional data block to be written to an additional corresponding logical address;

store the additional data block in the buffer;

store an entry for the write request in a queue, the entry comprising a reference to the first data block in the buffer;

associate the additional data block with the entry in the queue;

store an additional table entry in the mapping table, the additional table entry comprising the additional logical address, an additional physical address associated with an additional SSD of the plurality of SSDs, and an additional location of the additional data block in the buffer;

send a first write command to the first SSD, the first write command comprising the first data block;

receive an acknowledgment that the first data block has been written to the first SSD;

send an additional write command to the additional SSD, the additional write command comprising the additional data block;

receive an additional acknowledgment that the additional data block has been written to the additional SSD; and maintain the first data block in the buffer until a combined size of the plurality of data blocks in the buffer is equal to or greater than a threshold, the threshold being based on a number of SSDs in the plurality of SSDs and a block size of the plurality of SSDs.

16. The system of claim 15, wherein the processing device is further to:

set an acknowledgement status associated with the first data block in the buffer to indicate that the first write command has completed;

set the acknowledgment status associated with the additional data block in the buffer to indicate that the additional write command has completed; and responsive to determining that each write command associated with the write request has completed, the processing device is further to:

identify an oldest unacknowledged entry in the queue, wherein the oldest unacknowledged entry is an entry that is associated with at least one data block that has not been acknowledged and has been stored in the queue for a period of time that is greater than that of any other entry in the queue associated with data blocks that have not been acknowledged, and associate a reference pointer with the oldest unacknowledged entry in the queue.

17. A non-transitory computer readable storage medium having instructions that, when executed by a processing device of a storage server coupled to a plurality of solid state storage devices (SSDs), cause the processing device to perform operations comprising:

receiving, by the processing device, a write request to write to a first logical address of a virtual storage device that is mapped to the plurality of SSDs, wherein the write request comprises the first logical address and is associated with a first data block;

storing, by the processing device, the first data block in a buffer, wherein the first data block is one of a plurality of data blocks in the buffer;

storing a first table entry in a mapping table, the table entry comprising the first logical address, a first physical address associated with a first SSD of the plurality of SSDs, and a location of the first data block in the buffer;

storing, by the processing device, an entry for the write request in a queue, the entry comprising a reference to the first data block in the buffer;

sending, by the processing device, a first write command to the first SSD, the first write command comprising the first data block;

receiving, by the processing device, an acknowledgment that the first data block has been written to the first SSD;

maintaining the first data block in the buffer until a combined size of the plurality of data blocks in the buffer is equal to or greater than a threshold, the threshold being based on a number of SSDs in the plurality of SSDs and a block size of the plurality of SSDs;

determining a size of the buffer, wherein the size of the buffer comprises the combined size of the plurality of data blocks in the buffer;

determining that the size of the buffer is equal to or greater than the threshold; and deleting one or more data blocks from the buffer until the size of the buffer is equal to or less than a low buffer threshold.

18. The non-transitory computer readable storage medium of claim 17, the operations further comprising:

receiving a read request to read from the first logical address of the virtual storage device, wherein the read request is received after receiving the write request;

determining that the first data block in the buffer is associated with the first logical address;

retrieving the first data block associated with the first logical address from the buffer; and returning a response to the read request, wherein the response to the read request comprises the first data block retrieved from the buffer.

* * * * *